(12) United States Patent
Mademann et al.

(10) Patent No.: US 9,549,424 B2
(45) Date of Patent: Jan. 17, 2017

(54) DATA TRANSMISSION METHOD, DEVICE, AND SYSTEM

(71) Applicant: Huawei Technologies Co., Ltd., Shenzhen (CN)

(72) Inventors: Frank Mademann, Berlin (DE); Yijun Yu, Shanghai (CN); Wanqiang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 14/671,724

(22) Filed: Mar. 27, 2015

(65) Prior Publication Data

US 2015/0208450 A1 Jul. 23, 2015

Related U.S. Application Data

(63) Continuation of application No. PCT/CN2012/082430, filed on Sep. 29, 2012.

(51) Int. Cl.
*H04W 76/02* (2009.01)
*H04W 4/20* (2009.01)
(Continued)

(52) U.S. Cl.
CPC ........ *H04W 76/021* (2013.01); *H04L 65/1006* (2013.01); *H04W 4/20* (2013.01);
(Continued)

(58) Field of Classification Search
CPC .. H04W 4/20; H04W 88/182; H04W 72/0413; H04W 76/021; H04W 68/005; H04L 65/1006
See application file for complete search history.

(56) References Cited

U.S. PATENT DOCUMENTS

2009/0154408 A1* 6/2009 Jeong .................... H04W 76/02
370/329
2010/0255810 A1* 10/2010 Itaba .................... H04W 76/02
455/410
(Continued)

FOREIGN PATENT DOCUMENTS

CN 101931898 A 12/2010
CN 102413445 A 4/2012
(Continued)

OTHER PUBLICATIONS

"3rd Generation Partnership Project; Technical Specification Group Services and System Aspects; Machine-Type and other Mobile Data Applications Communications Enhancements (Release 12)," 3GPP TR 23.887, V0.2.1, Aug. 2012, 32 pages.
(Continued)

*Primary Examiner* — Khaled Kassim
*Assistant Examiner* — Syed S Ali
(74) *Attorney, Agent, or Firm* — Slater Matsil, LLP

(57) ABSTRACT

Embodiments of the present invention provide a data transmission method, device, and system. A terminal device determines whether a data volume of uplink data to be sent is less than a preset data volume threshold. If the data volume of the uplink data to be sent is less than the preset data volume threshold, the terminal device establishes an RRC connection to a base station and sends an RRC connection completion message that carries the uplink data to the base station, so that the base station sends the uplink data to an MME by using a signaling message between the base station and the MME. The MME further sends the uplink data to a corresponding application server by using a signaling message between the MME and a P-CSCF.

11 Claims, 13 Drawing Sheets

(51) Int. Cl.
*H04L 29/06* (2006.01)
*H04W 68/00* (2009.01)
*H04W 72/04* (2009.01)
*H04W 88/18* (2009.01)

(52) U.S. Cl.
CPC ..... *H04W 68/005* (2013.01); *H04W 72/0413* (2013.01); *H04W 88/182* (2013.01)

(56) References Cited

U.S. PATENT DOCUMENTS

| | | | |
|---|---|---|---|
| 2012/0088505 A1* | 4/2012 | Toh | H04W 8/186 455/434 |
| 2012/0093086 A1 | 4/2012 | Yin et al. | |
| 2012/0250509 A1* | 10/2012 | Leung | H04W 76/04 370/235 |
| 2013/0053029 A1* | 2/2013 | Anchan | H04W 76/022 455/432.3 |
| 2013/0173689 A1* | 7/2013 | Stonefield | H04L 65/605 709/203 |
| 2013/0223336 A1* | 8/2013 | Lindner | H04L 47/35 370/328 |
| 2014/0169269 A1* | 6/2014 | Salot | H04W 48/20 370/328 |

FOREIGN PATENT DOCUMENTS

| | | |
|---|---|---|
| CN | 102457825 A | 5/2012 |
| EP | 2732670 | 5/2014 |
| WO | 2013012759 A1 | 1/2013 |

OTHER PUBLICATIONS

"LTE Network Infrastructure and Elements," LTE Encyclopedia, May 30, 2012, 4 pages.

* cited by examiner

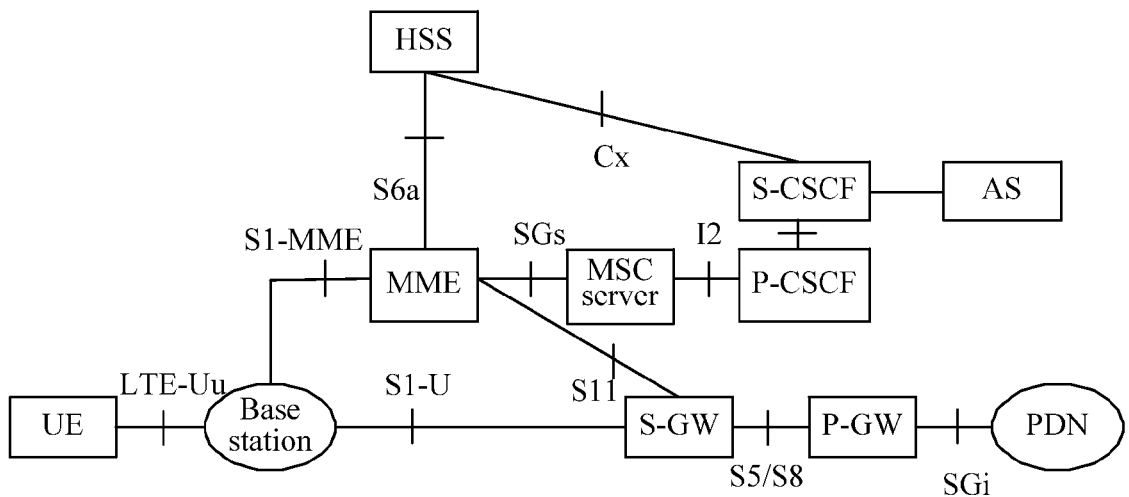

FIG. 5

| A P-CSCF receives, by using a first signaling message of a second type between the P-CSCF and an MME, uplink data that is sent by a terminal device to an application server, where the first signaling message of the second type is generated by the MME according to the uplink data in a first signaling message of a first type after the MME receives the first signaling message of the first type sent by a base station, the first signaling message of the second type includes the uplink data, and a data volume of the uplink data is less than a preset data volume threshold | 601 |
|---|---|

| The P-CSCF sends the uplink data to an S-CSCF, so that the S-CSCF sends the uplink data to the application server | 602 |
|---|---|

FIG. 6

DATA TRANSMISSION METHOD, DEVICE, AND SYSTEM

This application is a continuation of International Application No. PCT/CN2012/082430, filed on Sep. 29, 2012, which is hereby incorporated by reference in its entirety.

TECHNICAL FIELD

The present invention relates to communications technologies, and in particular, to a data transmission method, device, and system.

BACKGROUND

Machine type communication (MTC) refers to network communication between one or more network elements or devices without requiring human interaction, or may be referred to as machine-to-machine (M2M) communication. The MTC and some other MTC-like communications have features such as light interaction traffic and interaction burst. Therefore, data transmission in processes of the MTC and other MTC-like communication is generally referred to as small data transmission or low data usage transmission. Correspondingly, compared with a human-to-human (H2H) terminal, an MTC terminal and a terminal similar to the MTC terminal are generally referred to as small data transmission terminals or low data usage terminals.

At present, various types of small data transmission are implemented by combining a small data transmission architecture and a mobile communications network. Small data transmission in MTC is used as an example. An MTC architecture mainly includes an MTC-Interworking Function (MTC-IWF) network element and a service capability server (SCS). The MTC-IWF mainly implements functions such as SCS authentication, external identifier mapping, and make inquiry of a home subscriber server (HSS) in a mobile communications network to obtain service node information. The SCS provides a capability of MTC application, for example, a service capability such as M2M terminal triggering. However, the MTC application is provided by an application server (AS) outside the MTC architecture. To ensure small data transmission, in an existing solution, a network element, such as a packet data network gateway (PGW), in a mobile communications network needs to allocate an Internet Protocol (IP) address to each small data transmission terminal, create a radio access bearer (RAB) corresponding to data transmission, and reserve a resource required for data transmission, which causes waste of a resource in the mobile communications network.

SUMMARY

Embodiments of the present invention provide a data transmission method, device, and system, which are used to reduce network resource consumption during small data transmission.

A first aspect of the embodiments of the present invention provides a data transmission method. A terminal device determines whether a data volume of uplink data to be sent is less than a preset data volume threshold. When the data volume of the uplink data is less than the preset data volume threshold, the terminal device sends a Radio Resource Control (RRC) connection request message to a base station. The RRC connection request message includes indication information that instructs the base station to establish a signaling connection only for the terminal device. The terminal device receives an RRC connection establishment message sent by the base station. The terminal device carries the uplink data in an RRC connection completion message and sending the RRC connection completion message to the base station by the terminal, so that the base station sends the uplink data to a mobility management entity MME according to the indication information and by using a first signaling message of a first type between the base station and the MME, so that the MME sends the uplink data to an application server corresponding to the uplink data by using a first signaling message of a second type between the MME and a proxy-call session control function P-CSCF.

In a first possible implementation manner of the first aspect, before the determining, by a terminal device, whether a data volume of uplink data to be sent is less than a preset data volume threshold, the method includes sending, by the terminal device, an attach request message to the MME, so that the MME sends a first Session Initiation Protocol SIP registration request message to the application server by using a second signaling message of the second type between the MME and the P-CSCF, where the attach request message includes an identifier of the terminal device, and the first SIP registration request message includes the identifier of the terminal device and a SIP identifier corresponding to the terminal device; and receiving, by the terminal device, an attach accept message sent by the MME, where the attach accept message is generated by the MME after the MME receives, by using a third signaling message of the second type between the MME and the P-CSCF, a first SIP registration completion message returned by the application server, and the first SIP registration completion message is returned by the application server after the application server receives the SIP identifier corresponding to the terminal device. Only a signaling connection exists between the terminal device and the MME.

In a second possible implementation manner of the first aspect, before the determining, by a terminal device, whether a data volume of uplink data to be sent is less than a preset data volume threshold, the method includes sending, by the terminal device, an attach request message to the MME, where the attach request message includes an identifier of the terminal device; receiving, by the terminal device, an attach accept message sent by the MME, where the attach accept message includes an IP address that is allocated by the MME for the terminal device; sending, by the terminal device according to the IP address, a first SIP registration request message to the MME by using a second signaling message of a first type between the terminal device and the MME, so that the MME sends the first SIP registration request message to the application server by using a second signaling message of the second type between the MME and the P-CSCF, where the first SIP registration request message includes the identifier of the terminal device and a SIP identifier corresponding to the terminal device; and receiving, by the terminal device by using a third signaling message of the first type between the terminal device and the MME, a first SIP registration completion message returned by the MME, where the first SIP registration completion message is returned by the application server after the application server receives the SIP identifier corresponding to the terminal device, and the MME receives the first SIP registration completion message by using a third signaling message of the second type between the MME and the P-CSCF. Only a signaling connection exists between the terminal device and the MME.

In a third possible implementation manner of the first aspect, before the determining, by a terminal device, whether a data volume of uplink data to be sent is less than a preset data volume threshold, the method includes sending, by the terminal device, an attach request message to the MME, where the attach request message includes an identifier of the terminal device; and receiving, by the terminal device, an attach accept message sent by the MME. Only a signaling connection exists between the terminal device and the MME.

With reference to the first aspect, or the first possible implementation manner of the first aspect, or the second possible implementation manner of the first aspect, or the third possible implementation manner of the first aspect, in a fourth possible implementation manner of the first aspect, the data transmission method further includes receiving, by the terminal device, a paging message sent by the MME, where the paging message is generated by the MME after the MME receives, by using a fourth signaling message of the second type between the MME and the P-CSCF, downlink data that is sent by the application server to the terminal device; sending, by the terminal device, a service request message to the MME according to the paging message, where the service request message is used to instruct the MME to establish a signaling connection only for the terminal device; and receiving, by the terminal device, a fourth signaling message that is of the first type and sent by the MME according to the service request message, where the fourth signaling message of the first type includes the downlink data.

A second aspect of the embodiments of the present invention provides a data transmission method. A base station receives an RRC connection request message sent by a terminal device. The RRC connection request message is generated by the terminal device when the terminal device determines that a data volume of uplink data to be sent is less than a preset data volume threshold, and the RRC connection request message includes indication information that instructs the base station to establish a signaling connection only for the terminal device. The base station sends an RRC connection establishment message to the terminal device. The base station receives an RRC connection completion message sent by the terminal device. The RRC connection completion message includes the uplink data. The base station sends, according to the indication information, the uplink data to a mobility management entity (MME) by using a first signaling message of a first type between the base station and the MME, so that the MME sends the uplink data to an application server corresponding to the uplink data by using a first signaling message of a second type between the MME and a proxy-call session control function P-CSCF.

A third aspect of the embodiments of the present invention provides a data transmission method, including receiving, by a mobility management entity MME, a first signaling message of a first type sent by a base station, where the first signaling message of the first type is generated, according to indication information in a Radio Resource Control RRC connection request message sent by a terminal device, by the base station after the base station receives an RRC connection completion message sent by the terminal device, where the RRC connection completion message includes uplink data that is sent by the terminal device to an application server, the first signaling message of the first type includes the uplink data, and the indication information is used to instruct the base station to establish a signaling connection only for the terminal device; and sending, by the MME, the uplink data to the application server by using a first signaling message of a second type between the MME and a proxy-call session control function P-CSCF.

In a first possible implementation manner of the third aspect, before the receiving, by a mobility management entity MME, a first signaling message of a first type sent by a base station, the method includes receiving, by the MME, an attach request message sent by the terminal device, where the attach request message includes an identifier of the terminal device; acquiring, by the MME according to the identifier of the terminal device, a Session Initiation Protocol SIP identifier corresponding to the terminal device, and generating a first SIP registration request message, where the first SIP registration request message includes the identifier of the terminal device and the SIP identifier corresponding to the terminal device; sending, by the MME, the first SIP registration request message to the application server by using a second signaling message of the second type between the MME and the P-CSCF; receiving, by the MME by using a third signaling message of the second type between the MME and the P-CSCF, a first SIP registration completion message that is returned by the application server after the application server receives the SIP identifier corresponding to the terminal device; and sending, by the MME, an attach accept message to the terminal device, where the attach accept message includes the first SIP registration completion message. Only a signaling connection exists between the terminal device and the MME.

With reference to the first possible implementation manner of the third aspect, in a second possible implementation manner of the third aspect, the acquiring, by the MME according to the identifier of the terminal device, a SIP identifier corresponding to the terminal device includes sending, by the MME, a location update request message to a home subscriber server HSS, where the location update request message includes the identifier of the terminal device; and receiving, by the MME, a mapping relationship between the identifier of the terminal device and the SIP identifier corresponding to the terminal device, where the mapping relationship is returned by the HSS according to the identifier of the terminal device; or generating, by the MME according to the identifier of the terminal device, the SIP identifier corresponding to the terminal device.

In a third possible implementation manner of the third aspect, before the receiving, by a mobility management entity MME, a first signaling message of a first type sent by a base station, the method includes receiving, by the MME, an attach request message sent by the terminal device, where the attach request message includes an identifier of the terminal device; allocating, by the MME, an IP address to the terminal device; sending, by the MME, an attach accept message to the terminal device, where the attach accept message includes the IP address; receiving, by the MME, a second signaling message that is of the first type and sent by the terminal device according to the IP address, where the second signaling message of the first type includes a first SIP registration request message, and the first SIP registration request message includes the identifier of the terminal device and a SIP identifier corresponding to the terminal device; sending, by the MME, the first SIP registration request message to the application server by using a second signaling message of the second type between the MME and the P-CSCF; receiving, by the MME by using a third signaling message of the second type between the MME and the P-CSCF, a first SIP registration completion message that is returned by the application server after the application server receives the SIP identifier corresponding to the terminal device; and sending, by the MME, a third signaling message of the first type to the terminal device, where the third signaling message of the first type includes the first SIP registration completion message; where only a signaling connection exists between the terminal device and the MME.

In a fourth possible implementation manner of the third aspect, before the receiving, by a mobility management entity MME, a first signaling message of a first type sent by a base station, the method includes sending, by the MME, a second SIP registration request message to the P-CSCF by using a second signaling message of the second type between the MME and the P-CSCF, so that the P-CSCF sends the second SIP registration request message to the application server, where the second signaling message of the second type includes the second SIP registration request message, and the second SIP registration request message includes an identifier of the MME and a SIP identifier corresponding to the MME; and receiving, by the MME by using a third signaling message of the second type between the MME and the P-CSCF, a second SIP registration completion message that is returned by the application server after the application server receives the SIP identifier corresponding to the MME.

With reference to the fourth possible implementation manner of the third aspect, in a fifth possible implementation manner of the third aspect, after the receiving, by the MME by using a third signaling message of the second type between the MME and the P-CSCF, a second SIP registration completion message that is returned by the application server after the application server receives the SIP identifier corresponding to the MME, the method includes receiving, by the MME, an attach request message sent by the terminal device, where the attach request message includes an identifier of the terminal device; and sending, by the MME, an attach accept message to the terminal device; where only a signaling connection exists between the terminal device and the MME.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, in a sixth possible implementation manner of the third aspect, the data transmission method further includes receiving, by the MME by using a fourth signaling message of the second type between the MME and the P-CSCF, downlink data that is sent by the application server to the terminal device; sending, by the MME, a paging message to the terminal device; receiving, by the MME, a service request message sent by the terminal device; and sending, by the MME, a fourth signaling message of the first type to the terminal device, where the fourth signaling message of the first type includes the downlink data.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, in a seventh possible implementation manner of the third aspect, the sending, by the MME, the uplink data to the application server by using a first signaling message of a second type between the MME and a proxy-call session control function P-CSCF includes sending, by the MME, a first signaling message of a third type to an MSC server, where the first signaling message of the third type includes the uplink data, so that the MSC server encapsulates the uplink data into the first signaling message of the second type and sends the first signaling message of the second type to the P-CSCF, so as to send the uplink data to the application server.

With reference to the sixth possible implementation manner of the third aspect, in an eighth possible implementation manner of the third aspect, the receiving, by the MME by using a fourth signaling message of the second type between the MME and the P-CSCF, downlink data that is sent by the application server to the terminal device includes receiving, by the MME, a second signaling message of a third type sent by an MSC server, where the second signaling message of the third type is generated by the MSC server according to the fourth signaling message that is of the second type and sent by the P-CSCF, and the second signaling message of the third type includes the downlink data.

A fourth aspect of the embodiments of the present invention provides a data transmission method, including: receiving, by a proxy-call session control function P-CSCF by using a first signaling message of a second type between the P-CSCF and a mobility management entity MME, uplink data that is sent by a terminal device to an application server, where the first signaling message of the second type is generated by the MME according to the uplink data in a first signaling message of a first type after the MME receives the first signaling message of the first type sent by a base station, the first signaling message of the second type includes the uplink data, and a data volume of the uplink data is less than a preset data volume threshold; and sending, by the P-CSCF, the uplink data to an S-CSCF, so that the S-CSCF sends the uplink data to the application server.

In a first possible implementation manner of the fourth aspect, before the receiving, by a proxy-call session control function P-CSCF by using a first signaling message of a second type between the P-CSCF and a mobility management entity MME, uplink data that is sent by a terminal device to an application server, the method includes receiving, by the P-CSCF by using a second signaling message of the second type between the P-CSCF and the MME, a first SIP registration request message sent by the MME, where the first SIP registration request message includes an identifier of the terminal device and a SIP identifier corresponding to the terminal device; sending, by the P-CSCF, the first SIP registration request message to the S-CSCF, so that the S-CSCF sends the first SIP registration request message to the application server; receiving, by the P-CSCF, a first SIP registration completion message that is sent by the S-CSCF and returned by the application server after the application server receives the SIP identifier corresponding to the terminal device; and sending, by the P-CSCF, the first SIP registration completion message to the MME by using a third signaling message of the second type between the P-CSCF and the MME.

In a second possible implementation manner of the fourth aspect, before the receiving, by a proxy-call session control function P-CSCF by using a first signaling message of a second type between the P-CSCF and a mobility management entity MME, uplink data that is sent by a terminal device to an application server, the method includes receiving, by the P-CSCF by using a second signaling message of the second type between the P-CSCF and the MME, a second SIP registration request message sent by the MME, where the second SIP registration request message includes an identifier of the MME and a SIP identifier corresponding to the MME; sending, by the P-CSCF, the second SIP registration request message to the S-CSCF, so that the S-CSCF sends the second SIP registration request message to the application server; receiving, by the P-CSCF, a second SIP registration completion message that is sent by the S-CSCF and returned by the application server after the application server receives the SIP identifier corresponding to the MME; and sending, by the P-CSCF, the second SIP registration completion message to the MME by using a third signaling message of the second type between the P-CSCF and the MME.

With reference to the second possible implementation manner of the fourth aspect, in a third possible implementation manner of the fourth aspect, the data transmission method further includes receiving, by the P-CSCF, address information of the MME and downlink data that are sent by the S-CSCF, where the downlink data is sent by the application server to the terminal device, and the address information of the MME is acquired by the S-CSCF by querying a home subscriber server HSS according to a SIP identifier corresponding to the terminal device, where the HSS stores a mapping relationship between an identifier of the terminal device and the SIP identifier corresponding to the terminal device, and a mapping relationship between the identifier of the terminal device and the address information of the MME; and sending, by the P-CSCF, the downlink data to the MME according to the address information of the MME and by using a fourth signaling message of the second type between the P-CSCF and the MME.

With reference to the fourth aspect, or the first possible implementation manner of the fourth aspect, or the second possible implementation manner of the fourth aspect, or the third possible implementation manner of the fourth aspect, in a fourth possible implementation manner of the fourth aspect, the receiving, by a proxy-call session control function P-CSCF by using a first signaling message of a second type between the P-CSCF and a mobility management entity MME, uplink data that is sent by a terminal device to an application server includes receiving, by the P-CSCF, the second signaling message sent by an MSC server, where the second signaling message is generated by the MSC server according to a first signaling message that is of a third type and sent by the MME, and the first signaling message of the third type includes the uplink data.

With reference to the fourth possible implementation manner of the fourth aspect, in a fifth possible implementation manner of the fourth aspect, the sending, by the P-CSCF, the downlink data to the MME according to the address information of the MME and by using a fourth signaling message of the second type between the P-CSCF and the MME includes sending, by the P-CSCF, the fourth signaling message of the second type to an MSC server, so that the MSC server encapsulates the downlink data in the fourth signaling message of the second type into a second signaling message of a third type and sends the second signaling message of the third type to the MME.

A fifth aspect of the embodiments of the present invention provides a proxy-call session control function, including: a receiver, configured to receive, by using a first signaling message of a second type between the P-CSCF and a mobility management entity MME, uplink data that is sent by a terminal device to an application server, where the first signaling message of the second type is generated by the MME according to the uplink data in a first signaling message of a first type after the MME receives the first signaling message of the first type sent by a base station, the first signaling message of the second type includes the uplink data, and a data volume of the uplink data is less than a preset data volume threshold; and a transmitter, configured to send the uplink data to an S-CSCF, so that the S-CSCF sends the uplink data to the application server.

According to the data transmission method, device, and system provided in the embodiments of the present invention, small data is transmitted based on a signaling message of a first type between an MME and a terminal device and a signaling message of a second type between the MME and a P-CSCF, and there is no need to specially establish or restore a user plane RAB between the terminal device and a network air interface side, which saves a network resource.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 5 is another system architecture diagram, on which the embodiments of the present invention are based, for implementing small data transmission;

FIG. 6 is a flowchart of a data transmission method according to yet another embodiment of the present invention;

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

To resolve a problem of network resource waste caused by creating an RAB for various types of small data transmission and reserving a resource required for data transmission in the prior art, the following embodiments of the present invention provide a new data transmission method. According to the method, a signaling message is used to transmit small data, there is no need to create a user plane RAB for small data transmission, and there is also no need to reserve a corresponding resource for small data transmission, which implements small data transmission, and resolves a problem of resource waste caused by small data transmission in the prior art.

It should be noted herein that the small data in each embodiment of the present invention may be small data in MTC, or may be small data in another communications system. The so-called small data refers to data with a data volume less than a preset data volume threshold, where the preset data volume threshold may be set according to different communications systems or requirements, and its specific value is not limited in the embodiments.

Figure 1:
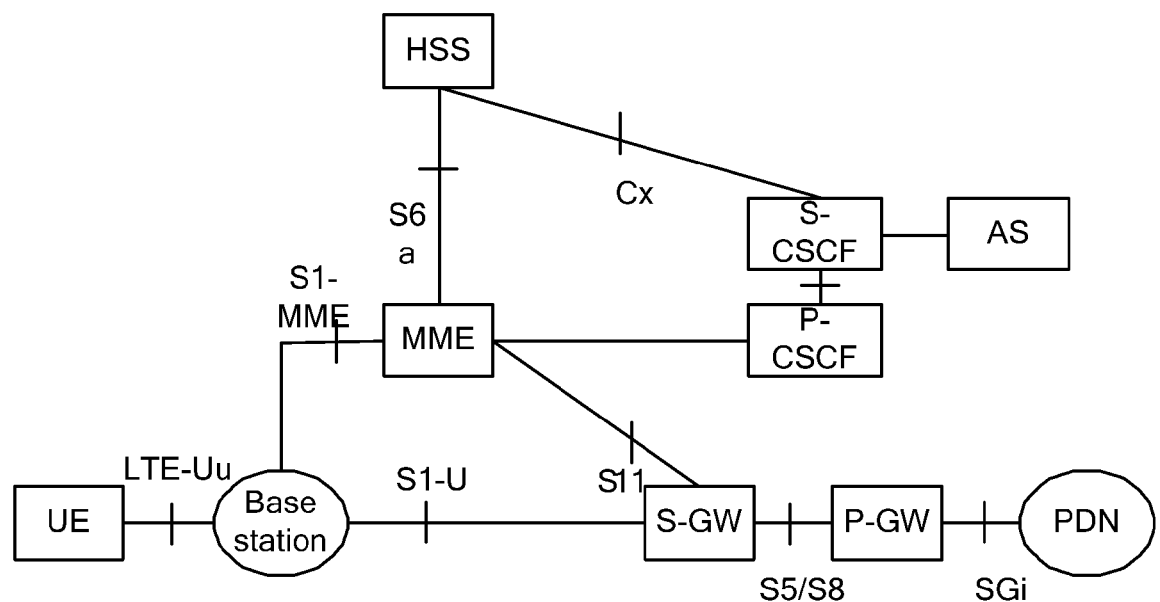
FIG. 1 is a system architecture diagram, on which the following embodiments of the present invention are based, for implementing small data transmission.

FIG. 1 is a system architecture diagram, on which the following embodiments of the present invention are based, for implementing small data transmission. As shown in FIG. 1, a system in the embodiments includes a base station, a mobility management entity (MME), a serving gateway (SGW), a PGW, a home subscriber server (HSS), a proxy-call session control function (P-CSCF), a serving-call session control function (S-CSCF), and an AS, where the MME, the PGW, and the SGW are three functional entities in a evolved packet core network, and the P-CSCF and the S-CSCF are core processing components in an IMS network, and are configured for user registration control, session control, and other functions. The S-CSCF occupies a core control position in an entire session control process of an IMS core network, receives a registration request that is forwarded by an IMS terminal from a visited network by using the P-CSCF, performs authentication on an IMS terminal user in collaboration with the HSS, downloads IMS basic subscription data from the HSS, and executes a basic session routing function for IMS terminal users at an originating end and at a terminating end. Optionally, as shown in FIG. 1, the architecture further includes a user equipment (UE) and a public data network (PDN). The UE in each embodiment of the present invention may be various small data transmission terminals or low data usage terminals, for example, may be an MTC terminal, which, however, is not limited thereto. In addition, the UE in each embodiment of the present invention may not only transmit small data, but also transmit big data. The so-called big data is relative to small data.

As shown in FIG. 1, a UE is connected to a base station, and an interface between the UE and the base station is a Uu interface; the base station is connected to an MME, and an interface between the base station and the MME is an S1-MME interface; the base station is connected to an SGW, and an interface between the base station and the SGW is an S1-U interface; the SGW is connected to a PGW, and an interface between the SGW and the PGW is an S5/S8 interface; the PGW is connected to a PDN, and an interface between the PGW and the PDN is an SGi interface; the SGW is connected to the MME, and an interface between the SGW and the MME is an S11 interface; the MME is connected to an HSS, and an interface between the MME and the HSS is an S6a interface; a P-CSCF is connected to the MME; the P-CSCF is connected to an S-CSCF; the S-CSCF is connected to the HSS, and an interface between the S-CSCF and the HSS is a Cx interface; and an AS is connected to the S-CSCF. The AS is an application server in a small data transmission system, and a connection relationship between the AS and the S-CSCF depends on a structure of the small data transmission system. For example, if the small data transmission system is an MTC system, the AS may be directly connected to the S-CSCF, may also be connected to the S-CSCF by using an SCS in the MTC system, or may be connected to the S-CSCF by using the SCS and an MTC-IWF. An interface between the AS and the S-CSCF or an interface between the SCS and the S-CSCF may be referred to as an ISC interface, and an interface between the SCS and the MTC-IWF may be referred to as a Tsp interface.

Names of the foregoing interfaces are not limited thereto, which are merely used as examples for description in the embodiments. The foregoing Cx interface may be implemented by using the Diameter protocol, where the Diameter protocol is an upgrade version of the Remote Authentication Dial In User Service (RADIUS) protocol. Main functions of the Cx interface include exchange of authentication information and subscription information between the S-CSCF and the HSS, query of S-CSCF information assigned by a user, and the like. The Tsp interface is mainly used to transmit related control plane signaling such as device triggering. The ISC interface may be implemented by using the Session Initiation Protocol (SIP), and the S-CSCF communicates with the AS by using the ISC interface, so as to implement support for a small data service.

It should be noted herein that the "connect" mentioned in each embodiment of the present invention includes direct connection, and also includes indirect connection implemented by using another device or network element.

As shown in FIG. 1, the architecture implements an interface between a small data transmission system and an IMS network, and supports transmission of a small amount of data in the small data transmission system by using an IMS network element. In addition, in FIG. 1, the MME is connected to the P-CSCF instead of being connected to the P-CSCF via the PGW, which provides a condition for small data transmission between the UE and the MME by using a signaling message, so that there is no need to establish a default user plane RAB for small data transmission. By using the system architecture shown in FIG. 1 as an example, the following describes a procedure of a data transmission method provided in the embodiments of the present invention.

Figure 2:
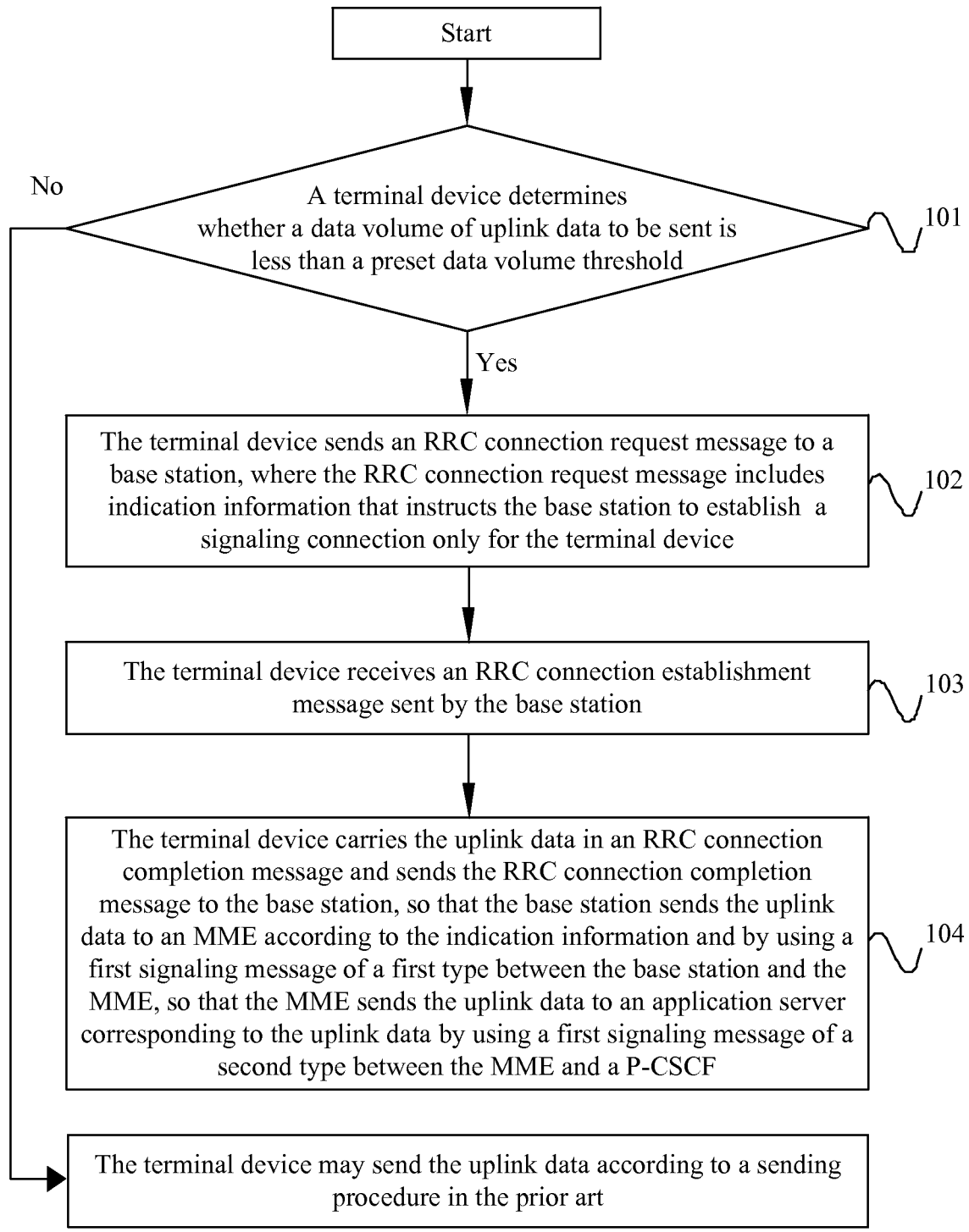
FIG. 2 is a flowchart of a data transmission method according to an embodiment of the present invention.

FIG. 2 is a flowchart of a data transmission method according to an embodiment of the present invention. This embodiment is described from a perspective of a terminal device. As shown in FIG. 1, the method in this embodiment includes the following steps.

Step 10l: A terminal device determines whether a data volume of uplink data to be sent is less than a preset data volume threshold, if the data volume of the uplink data to be sent is less than the preset data volume threshold, that is, the data volume of the uplink data is less than the preset data volume threshold, perform step 102, and if the data volume of the uplink data to be sent is not less than the preset data volume threshold, optionally, the terminal device may send the uplink data according to a sending procedure in the prior art.

In each embodiment of the present invention, data sent by the terminal device to an application server is referred to as uplink data, and correspondingly, data sent by the application server to the terminal device is referred to as downlink data.

Specifically, when the terminal device needs to send the uplink data to the application server, the terminal device determines whether the data volume of the uplink data to be sent is small data. The determining process is specifically to determine whether the data volume of the uplink data to be sent is less than the preset data volume threshold, if the data volume of the uplink data to be sent is less than the preset data volume threshold, it indicates that the uplink data to be sent is small data, and if the data volume of the uplink data to be sent is not less than the preset data volume threshold, it indicates that the uplink data to be sent is not small data (but big data). When it is determined that the uplink data to be sent is small data, the terminal device continues to perform subsequent steps to perform transmission in a signaling manner; when it is determined that the uplink data to be sent is not small data, the terminal device performs transmission in a data manner. If performing transmission in the data manner belongs to an existing conventional procedure, that is, if it is necessary to establish a user plane RAB, reference may be made to the existing procedure for this process, and details are not described in this embodiment again.

Step 102: The terminal device sends an RRC connection request message to a base station, where the RRC connection request message includes indication information that instructs the base station to establish a signaling connection only for the terminal device.

Optionally, the indication information may be carried by using an information element "establishment cause" in the RRC connection request message, which, however, is not limited thereto. For example, the terminal device may also extend a new field in the RRC connection request message, or add a new information element (IE) to an existing field to carry the indication information.

Step 103: The terminal device receives an RRC connection establishment message sent by the base station.

Step 104: The terminal device carries the uplink data in an RRC connection completion message and sends the RRC connection completion message to the base station, so that the base station sends the uplink data to an MME according to the indication information and by using a first signaling message of a first type between the base station and the MME, so that the MME sends the uplink data to an application server corresponding to the uplink data by using a first signaling message of a second type between the MME and a P-CSCF.

The foregoing step 102 to step 104 describe a process in which the terminal device establishes an RRC connection to the base station, and sends the uplink data to the base station by using a signaling message between the terminal device and the base station. Meanwhile, in the process of establishing the RRC connection to the base station, the terminal device instructs the base station to establish a signaling connection only for the terminal device, so that the base station and a network element (which mainly refers to the MME herein) in a core network establish a signaling connection only for the terminal device, which lays a foundation for the terminal device to send, by using signaling, the uplink data to the application server.

After receiving the uplink data sent by the terminal device, the base station carries the uplink data in a signaling message that is between the base station and the MME and sends the signaling message to the MME. As shown in FIG. 1, in this embodiment, the MME is connected to the P-CSCF. Therefore, after receiving the uplink data that is sent by the base station by using the signaling message, the MME carries the uplink data in a signaling message that is between the MME and the P-CSCF and sends the signaling message to the P-CSCF, so that the P-CSCF eventually sends the uplink data to the application server by using an S-CSCF.

In the foregoing process, a signaling protocol used between the base station and the MME is referred to as a signaling protocol of a first type, and a signaling message in the signaling protocol of the first type is referred to as a signaling message of a first type; a signaling protocol used between the MME and the P-CSCF is referred to as a signaling protocol of a second type, and a signaling message in the signaling protocol of the second type is referred to as a signaling message of a second type. To distinguish each signaling message of the first type, the signaling message of the first type is separately preceded by a numeral such as first, second, third, fourth, or fifth. Likewise, to distinguish each signaling message of the second type, the signaling message of the second type is also preceded by a numeral such as first, second, third, fourth, or fifth. However, the numeral herein, such as "first, second, third, fourth, or fifth" neither means a quantity, nor represents a sequence, but for ease of distinguishing.

The foregoing signaling protocol of the first type and the foregoing signaling protocol of the second type may be a same signaling protocol, or may be different signaling protocols. More preferably, the signaling protocol of the first type is the Non-Access Stratum (NAS) protocol, and the signaling protocol of the second type is SIP.

In the foregoing data sending process, only a signaling connection exists between the MME and a UE, there's no user plane RAB exists between the MME and a UE.

In this embodiment, when determining that uplink data to be sent is small data, a terminal device determines to choose a signaling manner for transmission. Therefore, in a process of establishing an RRC connection to a base station, the terminal device instructs the base station to establish a signaling connection only for the terminal device, so that the uplink data is sent to an application server by using a first signaling message of a first type between the base station and an MME and a first signaling message of a second type between the MME and a P-CSCF. There is no need to establish a user plane RAB between the MME and the terminal device, and there is also no need to reserve another resource required for the terminal device to transmit small data, which saves a network resource, and helps make full use of a network resource in big data transmission.

Further, in the prior art, to save a radio resource and reduce power consumption of a terminal device, if the terminal device does not perform service interaction with a network side within a period of time, that is, neither signaling interaction nor user plane RAB interaction is performed, the network side releases a signaling connection and a user plane RAB between an air interface side and the terminal device; in this case, the terminal device is in an idle state (Idle State). When the terminal device needs to send or receive user-plane data, the terminal device needs to first restore a signaling connection between the terminal device and the network side, and then restore a user plane RAB between the terminal device and the network side by using the signaling connection; in this case, the terminal device is in a connected state (Connected State). For some services with a small data volume, in the foregoing process, only a very small amount of user-plane data needs to be transmitted for each service; therefore, a terminal device in an idle state needs to restore a signaling connection each time, and further restore a user plane RAB on an air interface side by using the signaling connection, which increases a signaling overhead, increases network load, and increases operation costs of an operator. According to the method in this embodiment, small data is transmitted by using signaling, there is no need to establish a user plane RAB, and there is no need to restore the user plane RAB, which may resolve the foregoing problem, helps reduce a burden on a network, reduces operation costs of an operator, and helps increase a transmission rate of small data.

Before small data transmission is performed, the terminal device needs to register with the application server, or the MME takes the place of the terminal device to register with the application server. Based on this, in an optional implementation manner, before the terminal device determines whether a data volume of uplink data to be sent is less than a preset data volume threshold, the method may include the following:

The terminal device sends an attach request message to the MME, so that the MME sends a first SIP registration request message to the application server by using a second signaling message of the second type between the MME and the P-CSCF. The attach request message includes an identifier of the terminal device, for example, the identifier of the terminal device may be an international mobile subscriber identity (IMSI) of the terminal device. The first SIP registration request message includes the foregoing identifier of the terminal device and a SIP identifier corresponding to the terminal device.

The terminal device receives an attach accept message sent by the MME, where the attach accept message is generated by the MME after the MME receives, by using a third signaling message of the second type between the MME and the P-CSCF, a first SIP registration completion message returned by the application server, and the first SIP registration completion message is returned by the application server after the application server receives the SIP identifier corresponding to the terminal device.

The foregoing process is a process in which the terminal device executes an EPS attach procedure. In this implementation manner, the attach procedure includes authentication, location update, and other operations, but no default bearer is created, that is, only a signaling connection exists between the terminal device and the MME. In this attach procedure, the MME, as a user agent (user agent), interacts with an IMS system and the AS, and takes the place of the terminal device to implement a procedure for registering with the application server. A process in which the MME takes the place of the terminal device to register with the application server causes no impact on interaction of signaling of the first type between the terminal device and the MME. In this implementation manner, the terminal device does not require an IP address, and the terminal device also does not need to store a SIP identifier corresponding to the terminal device itself. The SIP identifier corresponding to the terminal device in the first SIP registration request message may be returned to the MME by an HSS in the attach procedure. The HSS stores a mapping relationship between the identifier of the terminal device and the SIP identifier corresponding to the terminal device. In addition, the SIP identifier corresponding to the terminal device in the first SIP registration request message may also be allocated by the MME for the terminal device according to the identifier of the terminal device.

Before small data transmission is performed, the terminal device needs to register with the application server, or the MME takes the place of the terminal device to register with the application server. Based on this, in another optional implementation manner, before the terminal device determines whether a data volume of uplink data to be sent is less than a preset data volume threshold, the method may include the following:

The terminal device sends an attach request message to the MME, where the attach request message includes an identifier of the terminal device.

The terminal device receives an attach accept message sent by the MME, where the attach accept message includes an IP address that is allocated by the MME for the terminal device.

The terminal device sends, according to the IP address that is allocated by the MME for the terminal device, a first SIP registration request message to the MME by using a second signaling message of the first type between the terminal device and the MME, so that the MME sends the first SIP registration request message to the application server by using a second signaling message of the second type between the MME and the P-CSCF. The first SIP registration request message includes the identifier of the terminal device and a SIP identifier corresponding to the terminal device.

The terminal device receives, by using a third signaling message of the first type between the terminal device and the MME, a first SIP registration completion message returned by the MME, where the first SIP registration completion message is returned by the application server after the application server receives the SIP identifier corresponding to the terminal device, and the MME receives the first SIP registration completion message by using a third signaling message of the second type between the MME and the P-CSCF.

The foregoing process is a process in which the terminal device executes an EPS attach procedure. In this implementation manner, the attach procedure includes authentication, location update, and other operations, but no default bearer is created, that is, only a signaling connection exists between the terminal device and the MME. In this attach procedure, the MME allocates the IP address to the terminal device. The terminal device pre-stores the SIP identifier corresponding to the terminal device. The terminal device itself, as a user agent (user agent), initiates a SIP registration procedure to the application server, and encapsulates the first SIP registration request message into a signaling message of the first type and sends the signaling message of the first type to the MME, and the first SIP registration request message is transmitted to the application server by using a signaling message of the second type between the MME and the P-CSCF, thereby implementing the SIP registration procedure, and laying a foundation for subsequent data transmission between the terminal device and the application server.

A manner in which the foregoing terminal device pre-stores the corresponding SIP identifier includes but is not limited to: the terminal device presets a corresponding SIP identifier when the terminal device is delivered from a factory; or a network side (which mainly refers to the P-CSCF) sends a signaling message to the terminal device in advance, and configures a corresponding SIP identifier for the terminal device.

Before small data transmission is performed, the terminal device registers with the application server, or the MME takes the place of the terminal device to register with the application server. Based on this, in still another optional implementation manner, before the terminal device determines whether a data volume of uplink data to be sent is less than a preset data volume threshold, the method may include the following:

The terminal device sends an attach request message to the MME, where the attach request message includes an identifier of the terminal device.

The terminal device receives an attach accept message sent by the MME.

The foregoing process is a process in which the terminal device executes an EPS attach procedure. In this implementation manner, the attach procedure includes authentication, location update, and other operations, but no default bearer is created, that is, only a signaling connection exists between the terminal device and the MME. Before the attach procedure, the MME registers with the application server in advance, and there is no need for each terminal device connected to the MME to register with the application server, which may reduce the number of times of registering with the application server and save a resource.

In an optional implementation manner of this embodiment, in addition to sending uplink data to the application server, the terminal device may also receive downlink data sent by the application server. A process in which the terminal device receives the downlink data sent by the application server may include the following:

The terminal device receives a paging message sent by the MME, where the paging message is generated by the MME after the MME receives, by using a fourth signaling message of the second type between the MME and the P-CSCF, the downlink data that is sent by the application server to the terminal device.

The terminal device sends a service request message to the MME according to the paging message, where the service request message is used to instruct the MME to establish a signaling connection only for the terminal device.

The terminal device receives a fourth signaling message that is of the first type and sent by the MME according to the service request message, where the fourth signaling message of the first type includes the foregoing downlink data.

In this implementation manner, the downlink data sent by the application server to the terminal device is also transmitted by using a signaling message of the second type between the MME and the P-CSCF and a signaling message of the first type between the MME and the terminal device; similarly, there is only a signaling connection exists between the MME and the terminal device, and there is no need to establish a user plane RAB for the terminal device, which also helps save a network resource.

It should be noted herein that, in the foregoing implementation manners, interaction between the terminal device and the MME needs to be performed by using a base station. Because the base station merely plays a forwarding role in the foregoing processes, the base station is omitted for brevity of description.

Figure 3:
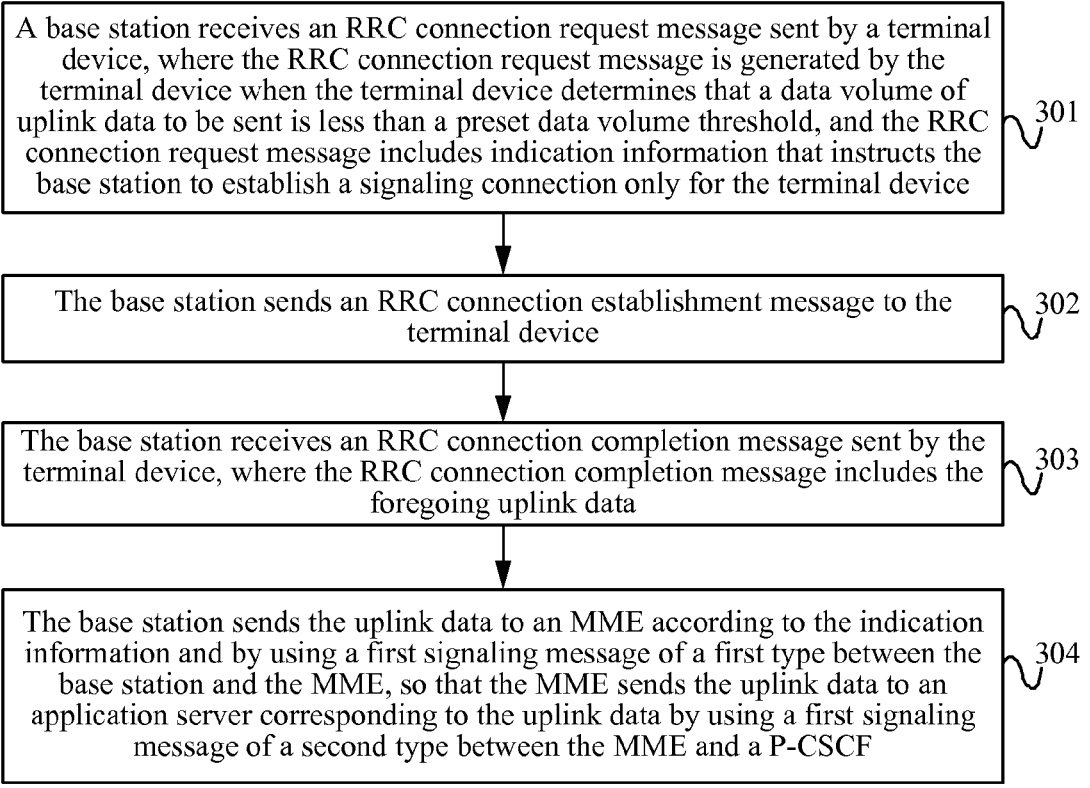
FIG. 3 is a flowchart of a data transmission method according to another embodiment of the present invention.

FIG. 3 is a flowchart of a data transmission method according to another embodiment of the present invention. This embodiment is described from a perspective of a base station. As shown in FIG. 3, the method in this embodiment includes the following steps.

Step 301: A base station receives an RRC connection request message sent by a terminal device, where the RRC connection request message is generated by the terminal device when the terminal device determines that a data volume of uplink data to be sent is less than a preset data volume threshold, and the RRC connection request message includes indication information that instructs the base station to establish a signaling connection only for the terminal device.

Step 302: The base station sends an RRC connection establishment message to the terminal device.

Step 303: The base station receives an RRC connection completion message sent by the terminal device, where the RRC connection completion message includes the foregoing uplink data.

Step 304: The base station sends the uplink data to an MME according to the indication information and by using a first signaling message of a first type between the base station and the MME, so that the MME sends the uplink data to an application server corresponding to the uplink data by using a first signaling message of a second type between the MME and a P-CSCF.

Specifically, when the terminal device needs to send the uplink data to the application server, the terminal device determines whether the data volume of the uplink data to be sent is small data. The determining process is specifically to determine whether the data volume of the uplink data to be sent is less than the preset data volume threshold, if the data volume of the uplink data to be sent is less than the preset data volume threshold, it indicates that the uplink data to be sent is small data, and if the data volume of the uplink data to be sent is not less than the preset data volume threshold, it indicates that the uplink data to be sent is not small data (that is, the uplink data is big data). When it is determined that the uplink data to be sent is small data, the terminal device chooses to perform transmission in a signaling manner. Therefore, the terminal device sends the RRC connection request message to the base station, so as to request to establish an RRC connection to the base station, and meanwhile, instructs, by using the carried indication information, the base station to establish a signaling connection only for the terminal device. Correspondingly, the base station receives the RRC connection request message sent by the terminal device, and sends the RRC connection establishment message to the terminal device, so as to establish an RRC connection to the terminal device. Correspondingly, after receiving the RRC connection establishment message, the terminal device sends the uplink data to the base station by using the RRC connection completion message. The base station sends the uplink data to the MME based on the indication information and by using the first signaling message of the first type between the base station and the MME, and the MME sends the uplink data to the P-CSCF by using the first signaling message of the second type between the MME and the P-CSCF, so that the P-CSCF further sends the uplink data to the application server by using an S-CSCF, thereby completing uplink data transmission.

It can be learned from the foregoing description that, in this embodiment, uplink data that is sent by a terminal device to an application server is transmitted by using a signaling message (that is, RRC connection completion message) between the terminal device and a base station, a signaling message between the base station and an MME, and a signaling message between the MME and a P-CSCF, so that only a signaling connection needs to exist between the MME and the terminal device, there is no need to establish a user plane RAB for the terminal device, and there is also no need to reserve another resource required for the terminal device to transmit small data, which saves a network resource, and helps increase a transmission rate of small data.

Figure 4:
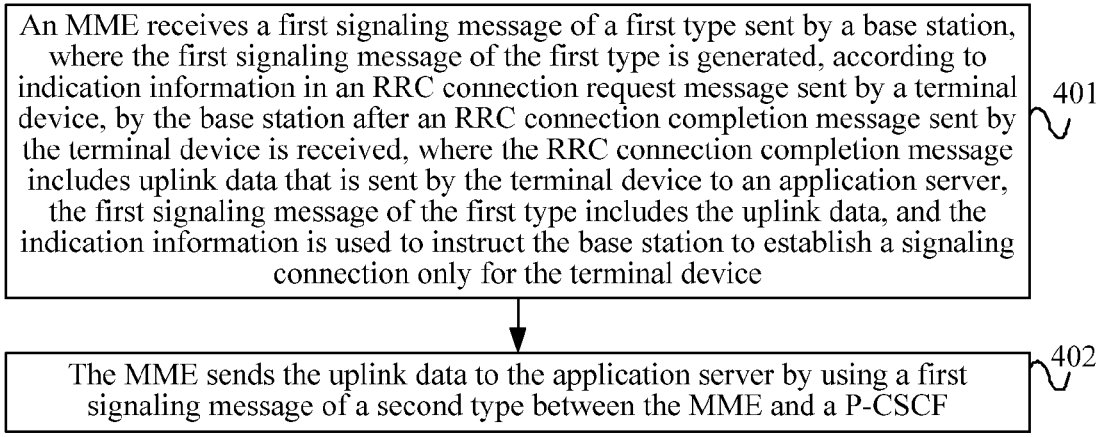
FIG. 4 is a flowchart of a data transmission method according to still another embodiment of the present invention.

FIG. 4 is a flowchart of a data transmission method according to still another embodiment of the present invention. This embodiment is described from a perspective of an MME. As shown in FIG. 4, the method in this embodiment includes the following steps.

Step 401: An MME receives a first signaling message of a first type sent by a base station, where the first signaling message of the first type is generated, according to indication information in an RRC connection request message sent by a terminal device, by the base station after the base station receives an RRC connection completion message sent by the terminal device, where the RRC connection completion message includes uplink data that is sent by the terminal device to an application server, the first signaling message of the first type includes the uplink data, and the indication information is used to instruct the base station to establish a signaling connection only for the terminal device.

Step 402: The MME sends the uplink data to the application server by using a first signaling message of a second type between the MME and a P-CSCF.

Specifically, when the terminal device needs to send the uplink data to the application server, the terminal device determines whether the data volume of the uplink data to be sent is small data. The determining process is specifically to determine whether the data volume of the uplink data to be sent is less than the preset data volume threshold, if the data volume of the uplink data to be sent is less than the preset data volume threshold, it indicates that the uplink data to be sent is small data, and if the data volume of the uplink data to be sent is not less than the preset data volume threshold, it indicates that the uplink data to be sent is not small data (that is, the uplink data is big data). When it is determined that the uplink data to be sent is small data, the terminal device chooses to perform transmission in a signaling manner. Therefore, the terminal device sends the RRC connection request message to the base station, so as to request to establish an RRC connection to the base station, and meanwhile, instructs, by using the carried indication information, the base station to establish a signaling connection only for the terminal device. Correspondingly, the base station receives the RRC connection request message sent by the terminal device, and sends an RRC connection establishment message to the terminal device, so as to establish an RRC connection for the terminal device. Correspondingly, after receiving the RRC connection establishment message, the terminal device sends the uplink data to the base station by using the RRC connection completion message. After receiving the RRC connection completion message, the base station acquires the uplink data from the RRC connection completion message, and encapsulates the uplink data into the first signaling message of the first type between the base station and the MME and sends the first signaling message of the first type to the MME. Correspondingly, the MME receives the first signaling message of the first type, acquires the uplink data from the first signaling message of the first type, and then encapsulates the uplink data into the first signaling message of the second type between the MME and the P-CSCF and sends the first signaling message of the second type to the P-CSCF, so that the P-CSCF further sends the uplink data to the application server by using an S-CSCF, thereby completing uplink data transmission.

It can be learned from the foregoing description that, in this embodiment, uplink data that is sent by a terminal device to an application server is transmitted by using a signaling message (that is, RRC connection completion message) between the terminal device and a base station, a signaling message between the base station and an MME, and a signaling message between the MME and a P-CSCF, so that only a signaling connection needs to exist between the MME and the terminal device, there is no need to establish a user plane RAB for the terminal device, and there is also no need to reserve another resource required for the terminal device to transmit small data, which saves a network resource, and helps increase a transmission rate of small data.

Before small data transmission is performed, the terminal device needs to register with the application server, or the MME takes the place of the terminal device to register with the application server. Based on this, in another optional implementation manner, before the MME receives a first signaling message of a first type sent by a base station, the method may include the following:

First, the MME receives an attach request message sent by the terminal device, where the attach request message includes an identifier of the terminal device. The identifier of the terminal device may be an IMSI of the terminal device, which, however, is not limited thereto.

Then, the MME acquires, according to the identifier of the terminal device, a SIP identifier corresponding to the terminal device, and generates a first SIP registration request message, where the first SIP registration request message includes the identifier of the terminal device and the SIP identifier corresponding to the terminal device.

Optionally, a manner in which the MME acquires, according to the identifier of the terminal device, a SIP identifier corresponding to the terminal device includes but is not limited to the following manners:

The MME sends a location update request message to an HSS, where the location update request message includes the identifier of the terminal device.

The MME receives a mapping relationship between the identifier of the terminal device and the SIP identifier corresponding to the terminal device, where the mapping relationship is returned by the HSS according to the identifier of the terminal device. Based on this, the MME acquires the SIP identifier corresponding to the terminal device from the mapping relationship between the identifier of the terminal device and the SIP identifier corresponding to the terminal device. Alternatively, the MME generates, according to the identifier of the terminal device, the SIP identifier corresponding to the terminal device.

Then, the MME sends the first SIP registration request message to the application server by using a second signaling message of the second type between the MME and the P-CSCF.

Then, the MME receives, by using a third signaling message of the second type between the MME and the P-CSCF, a first SIP registration completion message that is returned by the application server after the application server receives the SIP identifier corresponding to the terminal device.

Then, the MME sends an attach accept message to the terminal device, where the attach accept message includes the first SIP registration completion message.

The foregoing process is a process in which the terminal device executes an EPS attach procedure. In this implementation manner, the attach procedure includes authentication, location update, and other operations, but no default bearer is created, that is, only a signaling connection exists between the terminal device and the MME. In this attach procedure, the MME, as a user agent (user agent), interacts with an IMS system and the AS, and takes the place of the terminal device to implement a procedure for registering with the application server. A process in which the MME takes the place of the terminal device to register with the application server causes no impact on interaction of signaling of the first type between the terminal device and the MME. In this implementation manner, the terminal device does not require an IP address, and the terminal device also does not need to store a SIP identifier corresponding to the terminal device itself.

Before small data transmission is performed, the terminal device needs to register with the application server, or the MME takes the place of the terminal device to register with the application server. Based on this, in still another optional implementation manner, before the MME receives a first signaling message of a first type sent by a base station, the method may include the following:

The MME receives an attach request message sent by the terminal device, where the attach request message includes an identifier of the terminal device.

The MME allocates an IP address to the terminal device.

The MME sends an attach accept message to the terminal device, where the attach accept message includes the IP address.

The MME receives a second signaling message that is of the first type and sent by the terminal device according to the IP address, where the second signaling message of the first type includes a first SIP registration request message, where the first SIP registration request message includes the identifier of the terminal device and a SIP identifier corresponding to the terminal device.

In this process, the terminal device encapsulates the identifier of the terminal device and a SIP identifier that is pre-stored on the terminal device into the first SIP registration request message. A manner in which the terminal device pre-stores the SIP identifier includes but is not limited to: the terminal device presets a corresponding SIP identifier when the terminal device is delivered from a factory; or a network side (it mainly refers to the P-CSCF) sends a signaling message to the terminal device in advance, and configures a corresponding SIP identifier for the terminal device.

The MME sends the first SIP registration request message to the application server by using a second signaling message of the second type between the MME and the P-CSCF.

The MME receives, by using a third signaling message of the second type between the MME and the P-CSCF, a first SIP registration completion message that is returned by the application server after the application server receives the SIP identifier corresponding to the terminal device.

The MME sends a third signaling message of the first type to the terminal device, where the third signaling message of the first type includes the first SIP registration completion message.

The foregoing process is a process in which the terminal device executes an EPS attach procedure. In this implementation manner, the attach procedure includes authentication, location update, and other operations, but no default bearer is created, that is, only a signaling connection exists between the terminal device and the MME. In this attach procedure, the MME allocates the IP address to the terminal device. The terminal device pre-stores the SIP identifier corresponding to the terminal device. The terminal device itself, as a user agent (user agent), initiates a SIP registration procedure to the application server. The terminal device generates the first SIP registration request message, and then encapsulates the first SIP registration request message into a signaling message of the first type and sends the signaling message of the first type to the MME. The MME receives the signaling message of the first type, into which the first SIP registration request message is encapsulated, and then transmits the signaling message of the first type to the application server by using a signaling message of the second type between the MME and the P-CSCF, thereby implementing the SIP registration procedure, and laying a foundation for subsequent data transmission between the terminal device and the application server.

Before small data transmission is performed, the terminal device registers with the application server, or the MME takes the place of the terminal device to register with the application server. Based on this, in an optional implementation manner, before the MME receives a first signaling message of a first type sent by a base station, the method may include the following:

The MME sends a second SIP registration request message to the P-CSCF by using a second signaling message of the second type between the MME and the P-CSCF, so that the P-CSCF sends the second SIP registration request message to the application server, where the second signaling message of the second type includes the second SIP registration request message, and the second SIP registration request message includes an identifier of the MME and a SIP identifier corresponding to the MME.

The MME receives, by using a third signaling message of the second type between the MME and the P-CSCF, a second SIP registration completion message that is returned by the application server after the application server receives the SIP identifier corresponding to the MME.

The foregoing process is a process in which the MME registers with the application server. In this process, the MME registers its own identifier and the corresponding SIP identifier with the application server.

Based on the foregoing description, after the MME receives, by using a third signaling message of the second type between the MME and the P-CSCF, a second SIP registration completion message that is returned by the application server after the application server receives the SIP identifier corresponding to the MME, the method includes the following steps.

The MME receives an attach request message sent by the terminal device, where the attach request message includes an identifier of the terminal device.

The MME sends an attach accept message to the terminal device.

The foregoing process is a process in which the terminal device executes an EPS attach procedure after the MME implements a procedure for SIP registration with the application server. In this implementation manner, the attach procedure includes authentication, location update, and other operations, but no default bearer is created, that is, only a signaling connection exists between the terminal device and the MME. The MME registers with the application server in advance; therefore, there is no need for a terminal device connected to the MME terminal device connected to the MME to register with the application server again, which may reduce the number of times of registering with the application server and help save a resource.

In an optional implementation manner of this embodiment, in addition to sending uplink data to the application server, the terminal device may also receive downlink data sent by the application server. The downlink data that is sent by the application server to the terminal device is also transmitted by using a signaling message between the MME and the P-CSCF, and there is no need to establish a user plane RAB for the terminal device, which also helps save a network resource. A process of downlink data transmission includes the following:

The MME receives, by using a fourth signaling message of the second type between the MME and the P-CSCF, downlink data that is sent by the application server to the terminal device.

The MME sends a paging message to the terminal device.

The MME receives a service request message sent by the terminal device.

The MME sends a fourth signaling message of the first type to the terminal device, where the fourth signaling message of the first type includes the downlink data.

Specifically, when the application server needs to send downlink data, the application server sends the downlink data to an S-CSCF, and the S-CSCF sends the downlink data to the P-CSCF. After receiving the downlink data, the P-CSCF encapsulates the downlink data into the fourth signaling message of the second type and sends the fourth signaling message of the second type to the MME. The MME receives the fourth signaling message of the second type and obtains, by means of parsing, the downlink data from the fourth signaling message of the second type. Then, the MME sends the paging message to the terminal device, so as to notify the terminal device that there is downlink data that needs to be sent to the terminal device. After receiving the paging message, the terminal device sends the service request message to the MME, so as to request the MME to transmit the downlink data to the terminal device. After receiving the service request message, the MME encapsulates the downlink data into the fourth signaling message of the first type between the MME and the terminal device and sends the fourth signaling message of the first type to the terminal device. It can be learned that the downlink data that is sent by the application server to the terminal device is also transmitted by using a signaling message between the MME and the P-CSCF and a signaling message between the MME and the terminal device, and there is no need to establish a user plane RAB for the terminal device, which may also save a network resource.

In the foregoing embodiments, to implement transmission of uplink data or downlink data, the MME needs to support both a signaling protocol of a first type and a signaling protocol of a second type. If the signaling protocol of the first type is different from the signaling protocol of the second type, the MME needs to be improved, so as to support both the signaling protocol of the first type and the signaling protocol of the second type. To reduce modifications of the MME, a network element, in the prior art, that supports both the signaling protocol of the first type and the signaling protocol of the second type and has implemented interconnection with the MME may be used. A connection between the MME and the P-CSCF is established by using the network element, so as to reduce modifications of the MME. By using an example in which the signaling protocol of the first type is the NAS protocol and the signaling protocol of the second type is SIP, a mobile switching center (MSC) that supports SIP may be used to connect the MME and the P-CSCF.

FIG. 5 is another system architecture diagram, on which the embodiments of the present invention are based, for implementing small data transmission. Compared with FIG. 1, a difference lies in that: in FIG. 5, an MME is connected to a P-CSCF by using an MSC server. An interface between the MME and the MSC server is referred to as an SGs interface. In the prior art, the MSC server has implemented a connection to the MME, and the MSC server supports the signaling protocol of the second type and also has implemented interconnection with the P-CSCF.

Based on an architecture shown in FIG. 5, that the MME sends the uplink data to the application server by using a first signaling message of a second type between the MME and a P-CSCF includes sending, by the MME, a first signaling message of a third type to the MSC server, where the first signaling message of the third type includes the uplink data, so that the MSC server encapsulates the uplink data into the first signaling message of the second type and sends the first signaling message of the second type to the P-CSCF, so as to send the uplink data to the application server.

Correspondingly, that the MME receives, by using a fourth signaling message of the second type between the MME and the P-CSCF, downlink data that is sent by the application server to the terminal device includes receiving, by the MME, a second signaling message of the third type sent by the MSC server, where the second signaling message of the third type is generated by the MSC server according to the fourth signaling message that is of the second type and sent by the P-CSCF, and the second signaling message of the third type includes the downlink data.

The foregoing signaling protocol of the third type may be the signaling protocol of the first type, for example, the NAS protocol, or may be another signaling protocol different from the signaling protocol of the first type. An existing MME already can support the signaling protocol of the third type.

It can be learned from the foregoing description that, in this embodiment, by reusing a connection between the MME and the MSC server, interaction between the MME and the P-CSCF is implemented by using the MSC server, thereby reducing modifications of the MME.

FIG. 6 is a flowchart of a data transmission method according to yet another embodiment of the present invention. This embodiment is described from a perspective of a P-CSCF. As shown in FIG. 6, the method in this embodiment includes the following steps.

Step 601: A P-CSCF receives, by using a first signaling message of a second type between the P-CSCF and an MME, uplink data that is sent by a terminal device to an application server, where the first signaling message of the second type is generated by the MME according to the uplink data in a first signaling message of a first type after the MME receives the first signaling message of the first type sent by a base station, the first signaling message of the second type includes the uplink data, and a data volume of the uplink data is less than a preset data volume threshold.

Step 602: The P-CSCF sends the uplink data to an S-CSCF, so that the S-CSCF sends the uplink data to the application server.

Specifically, when the terminal device needs to send the uplink data to the application server, the terminal device determines whether the data volume of the uplink data to be sent is small data. The determining process is specifically to determine whether the data volume of the uplink data to be sent is less than the preset data volume threshold, if the data volume of the uplink data to be sent is less than the preset data volume threshold, it indicates that the uplink data to be sent is small data, and if the data volume of the uplink data to be sent is not less than the preset data volume threshold, it indicates that the uplink data to be sent is not small data (that is, the uplink data is big data).

When it is determined that the uplink data to be sent is small data, the terminal device chooses to perform transmission in a signaling manner. Therefore, the terminal device sends an RRC connection request message to the base station, so as to request to establish an RRC connection to the base station, and meanwhile, instructs, by using the carried indication information, the base station to establish a signaling connection only for the terminal device. Correspondingly, the base station receives the RRC connection request message sent by the terminal device, and sends an RRC connection establishment message to the terminal device, so as to establish an RRC connection for the terminal device. Correspondingly, after receiving the RRC connection establishment message, the terminal device sends the uplink data to the base station by using an RRC connection completion message.

After receiving the RRC connection completion message, the base station acquires the uplink data from the RRC connection completion message, and encapsulates the uplink data into the first signaling message of the first type between the base station and the MME and sends the first signaling message of the first type to the MME. Correspondingly, the MME receives the first signaling message of the first type, acquires the uplink data from the first signaling message of the first type, and then encapsulates the uplink data into the first signaling message of the second type between the P-CSCF and the MME and sends the first signaling message of the second type to the P-CSCF. Correspondingly, the P-CSCF receives the first signaling message of the second type, acquires the uplink data from the first signaling message of the second type, and then sends the uplink data to the S-CSCF, so that the S-CSCF sends the uplink data to the application server, thereby completing uplink data transmission.

It can be learned from the foregoing description that, in this embodiment, uplink data that is sent by a terminal device to an application server is transmitted by using a signaling message (that is, RRC connection completion message) between the terminal device and a base station, a signaling message between the base station and an MME, and a signaling message between the MME and a P-CSCF, so that only a signaling connection needs to exist between the MME and the terminal device, there is no need to establish a user plane RAB for the terminal device, and there is also no need to reserve another resource required for the terminal device to transmit small data, which saves a network resource, and helps increase a transmission rate of small data.

Before uplink data transmission is performed, the terminal device needs to register with the application server in advance, or the MME takes the place of the terminal device to register with the application server. Based on this, in an optional implementation manner, before the P-CSCF receives, by using a first signaling message of a second type between the P-CSCF and an MME, uplink data that is sent by a terminal device to an application server, the method includes the following:

The P-CSCF receives, by using a second signaling message of the second type between the P-CSCF and the MME, a first SIP registration request message sent by the MME, where the first SIP registration request message includes an identifier of the terminal device and a SIP identifier corresponding to the terminal device.

The P-CSCF sends the first SIP registration request message to the S-CSCF, so that the S-CSCF sends the first SIP registration request message to the application server.

The P-CSCF receives a first SIP registration completion message that is sent by the S-CSCF and returned by the application server after the application server receives the SIP identifier corresponding to the terminal device.

The P-CSCF sends the first SIP registration completion message to the MME by using a third signaling message of the second type between the P-CSCF and the MME.

The foregoing process is a process in which the terminal device registers with the application server. The registration process may be a procedure in which when the terminal device executes an EPS attach procedure, the MME, as a user agent (user agent), interacts with an IMS system and the application server, and takes the place of the terminal device to register with the application server. A process in which the MME takes the place of the terminal device to register with the application server causes no impact on interaction of signaling of the first type between the terminal device and the MME. In this implementation manner, the terminal device does not require an IP address, and the terminal device also does not need to store a SIP identifier corresponding to the terminal device itself. The first SIP registration request message is generated by the MME. The SIP identifier corresponding to the terminal device in the first SIP registration request message may be returned by an HSS to the MME in the attach procedure, and the HSS stores a mapping relationship between the identifier of the terminal device and the SIP identifier corresponding to the terminal device; or the SIP identifier corresponding to the terminal device in the first SIP registration request message may also be allocated by the MME for the terminal device according to the identifier of the terminal device.

In addition, the foregoing registration process may also be a SIP registration procedure that is initiated to the application server by the terminal device itself as a user agent (user agent) when the terminal device executes an EPS attach procedure and after the MME allocates an IP address to the terminal device. In this implementation manner, the first SIP registration request message is generated by the terminal device, and is then sent to the MME. The SIP identifier corresponding to the terminal device in the first SIP registration request message may be pre-stored on the terminal device.

Before uplink data transmission is performed, the terminal device needs to register with the application server in advance, or the MME takes the place of the terminal device to register with the application server. Based on this, in an optional implementation manner, before the P-CSCF receives, by using a first signaling message of a second type between the P-CSCF and an MME, uplink data that is sent by a terminal device to an application server, the method includes the following:

The P-CSCF receives, by using a second signaling message of the second type between the P-CSCF and the MME, a second SIP registration request message sent by the MME, where the second SIP registration request message includes an identifier of the MME and a SIP identifier corresponding to the MME.

The P-CSCF sends the second SIP registration request message to the S-CSCF, so that the S-CSCF sends the second SIP registration request message to the application server.

The P-CSCF receives a second SIP registration completion message that is sent by the S-CSCF and returned by the application server after the application server receives the SIP identifier corresponding to the MME.

The P-CSCF sends the second SIP registration completion message to the MME by using a third signaling message of the second type between the P-CSCF and the MME.

The foregoing description is a process in which before the terminal device executes the attach procedure, the MME, as a user agent, performs SIP registration with the application server. In this process, the second SIP registration request message is generated and sent by the MME. In this implementation manner, the MME registers with the application server in advance, and there is no need for each terminal device connected to the MME terminal device connected to the MME to register with the application server, which may reduce the number of times of registering with the application server and save a resource.

In an optional implementation manner of this embodiment, in addition to sending uplink data to the application server, the terminal device may also receive downlink data sent by the application server. A process in which the application server sends downlink data to the terminal device includes receiving, by the P-CSCF, address information of the MME and downlink data that are sent by the S-CSCF, where the downlink data is sent by the application server to the terminal device; and then sending, by the P-CSCF, the downlink data to the MME according to the address information of the MME and by using a fourth signaling message of the second type between the P-CSCF and the MME.

The address information of the MME is acquired by the S-CSCF by querying an HSS and according to a SIP identifier corresponding to the terminal device. The HSS stores a mapping relationship between an identifier of the terminal device and the SIP identifier corresponding to the terminal device, and a mapping relationship between the identifier of the terminal device and the address information of the MME. Specifically, the S-CSCF queries the HSS according to the SIP identifier corresponding to the terminal device, acquires the identifier of the terminal device, and then acquires the address information of the MME according to the identifier of the terminal device.

Based on the system architecture shown in FIG. 5, that the P-CSCF receives, by using a first signaling message of a second type between the P-CSCF and an MME, uplink data that is sent by a terminal device to an application server includes receiving, by the P-CSCF, a second signaling message sent by an MSC server, where the second signaling message is generated by the MSC server according to a first signaling message that is of a third type and sent by the MME, and the first signaling message of the third type includes the uplink data.

Correspondingly, that the P-CSCF sends the downlink data to the MME according to the address information of the MME and by using a fourth signaling message of the second type between the P-CSCF and the MME includes sending, by the P-CSCF, the fourth signaling message of the second type to the MSC server, so that the MSC server encapsulates the downlink data in the fourth signaling message of the second type into a second signaling message of the third type and sends the second signaling message of the third type to the MME.

It can be learned from the foregoing description that the downlink data sent by the application server to the terminal device is also transmitted by using a signaling message of the second type between the MME and the P-CSCF and a signaling message of the first type between the MME and the terminal device; similarly, there is only a signaling connection exists between the MME and the terminal device, and there is no need to establish a user plane RAB for the terminal device, which also helps save a network resource.

Figure 7:
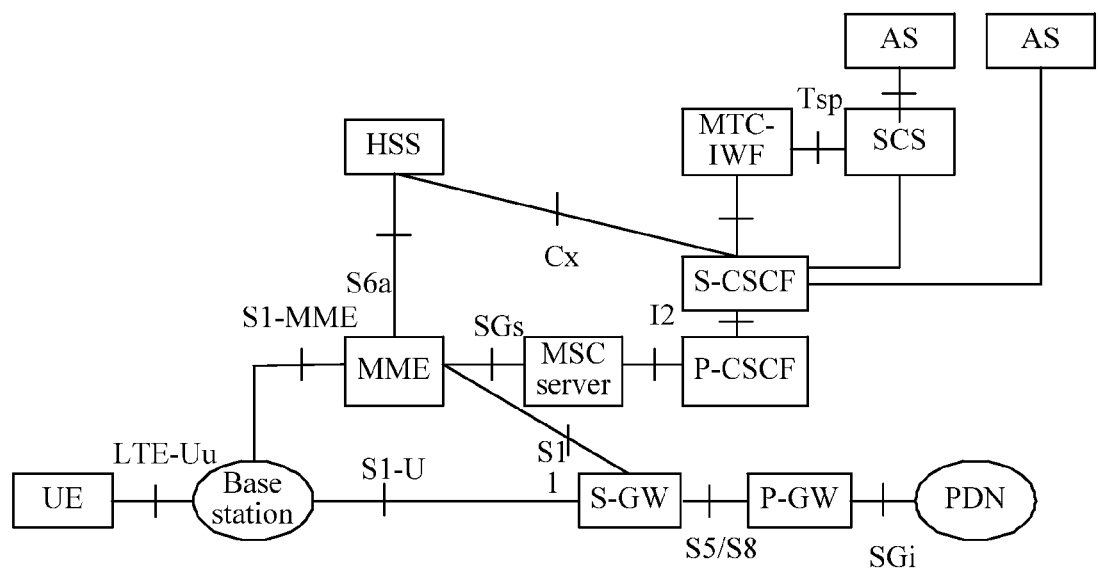
FIG. 7 is still another system architecture diagram, on which the embodiments of the present invention are based, for implementing small data transmission.

By using an example in which a small data transmission system is an MTC system, a system architecture for implementing small data transmission shown in FIG. 1 is specifically shown in FIG. 7. In FIG. 7, it is assumed that NAS signaling is used between network elements in a mobile core network, and SIP is used in an IMS system. The following describes in detail a process of small data transmission implemented based on the system architecture shown in FIG. 7.

Figure 8:
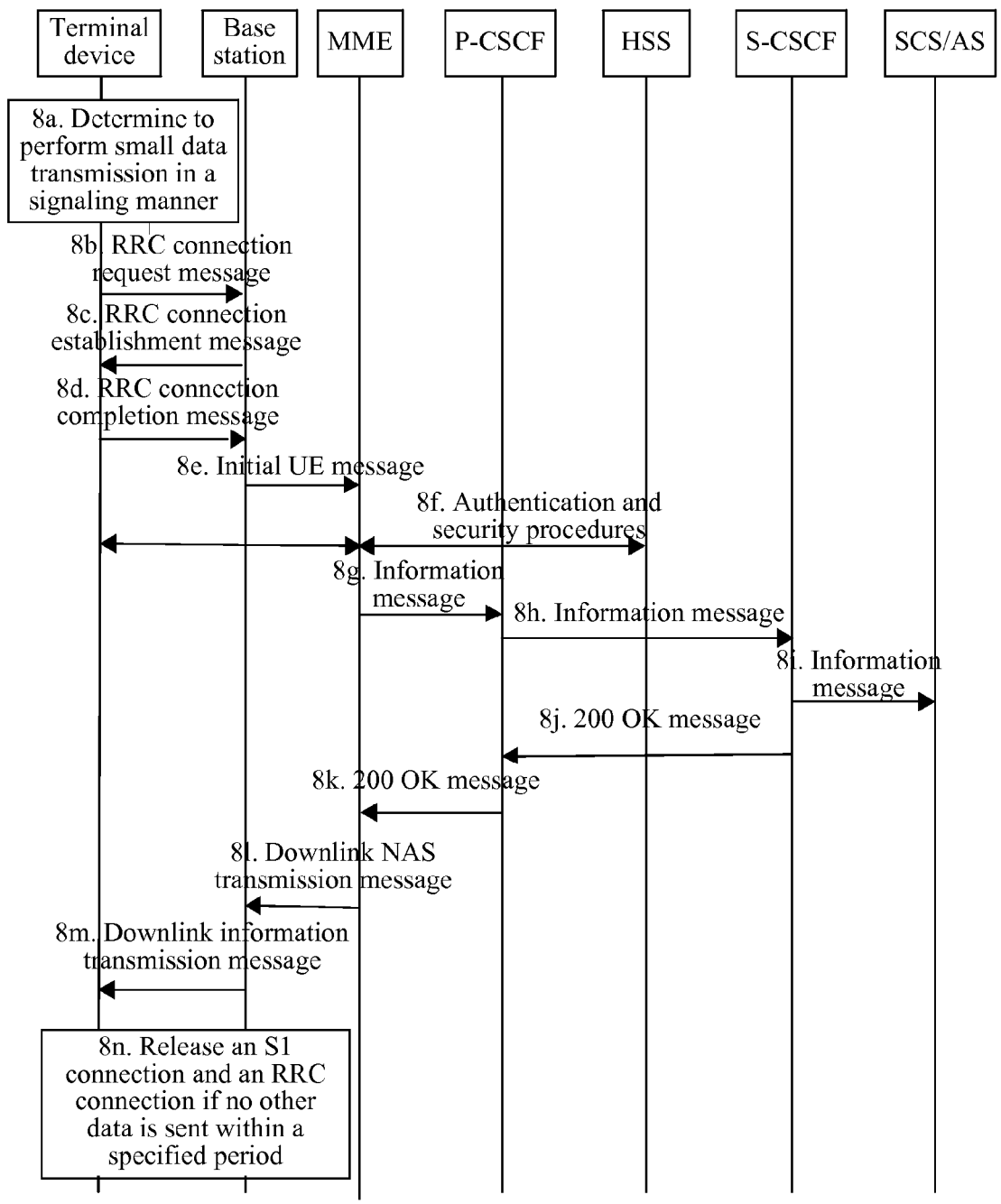
FIG. 8 is a flowchart of a small data transmission method according to an embodiment of the present invention.

FIG. 8 is a flowchart of a small data transmission method according to an embodiment of the present invention. This embodiment is described by using an example in which a terminal device sends uplink data to an application server. As shown in FIG. 8, the method in this embodiment includes the following steps.

Step 8*a*: A terminal device determines whether uplink data to be sent is small data, and when determining that the uplink data to be sent is small data, determines to send the small data in a signaling manner.

Specifically, the terminal device may choose, according to a data volume, to perform sending in a signaling manner or a data manner. If a data volume of the uplink data to be sent is less than a preset data volume threshold, the terminal device chooses to use the signaling manner; if the data volume of the uplink data to be sent is greater than or equal to the preset data volume threshold, the terminal device chooses to use the data manner. If the data manner is used, a conventional procedure is used, that is, it is necessary to establish a user plane RAB for the terminal device.

Step 8*b*: The terminal device sends an RRC connection request message to a base station, so as to request to establish an RRC connection, where an information element "establishment cause" carried in the RRC connection request message instructs the base station to establish a signaling connection only for the terminal device.

Step 8*c*: The base station sends an RRC connection establishment message to the terminal device, so as to instruct the terminal device to establish the RRC connection.

Step 8*d*: The terminal device sends an RRC connection completion message to the base station, where the RRC connection completion message carries a NAS protocol data unit (PPDU), and the uplink data to be sent is encapsulated into the NAS PDU.

A signaling connection is kept between an MME and the terminal device, and no user plane RAB is created or restored.

Step 8*e*: The base station sends the NAS PDU to an MME by using an initial UE message.

The initial UE message is a NAS signaling message and is equivalent to the foregoing first signaling message of the first type.

Step 8*f*: The terminal device performs authentication and security procedures with the MME, an HSS, and the like by using the base station.

This process pertains to the prior art, and details are not described herein again.

Step 8*g*: The MME acquires the uplink data from the initial UE message, and encapsulates the uplink data into an information message (MESSAGE) and sends the message to a P-CSCF.

Step 8*h*: The P-CSCF forwards the information message (MESSAGE) to an S-CSCF.

Step 8*i*: The S-CSCF triggers, based on initial filter criteria, transmission of the information message (MESSAGE) to an SCS/AS.

The foregoing MESSAGE message is a SIP signaling message and is equivalent to the foregoing first signaling message of the second type.

The initial filter criteria (iFC) provide a service triggering capability. When a user implements IMS registration, the initial filter criteria and an address of a specified application server AS have been downloaded to a corresponding S-CSCF. The S-CSCF triggers, based on the initial filter criteria, transmission of the information message (MESSAGE) to the SCS/AS, and forwards the information message to the specified AS application server.

Step 8*j*: The S-CSCF sends a 200 OK message to the P-CSCF.

Step 8*k*: The P-CSCF forwards the 200 OK message to the MME.

The foregoing 200 OK message is a SIP signaling message, is equivalent to a fifth signaling message of the second type, and is used to notify the P-CSCF, the MME, the terminal device, and the like that the uplink data has been successfully transmitted to the AS.

Step 8*l*: The MME sends the OK message to the base station by using a downlink NAS transmission message.

The downlink NAS transmission message belongs to a NAS signaling message, is equivalent to a fifth signaling message of the first type, and is used to carry the OK message to notify the base station and the terminal device that the uplink data has been successfully transmitted to the AS.

Step 8*m*: The base station transfers the OK message to the terminal device by using a downlink information transmission message.

Step 8*n*: If no other data is sent within a specified period, the base station releases an RRC connection between the base station and the terminal device and an S1 signaling connection between the base station and the MME.

Figure 9A:
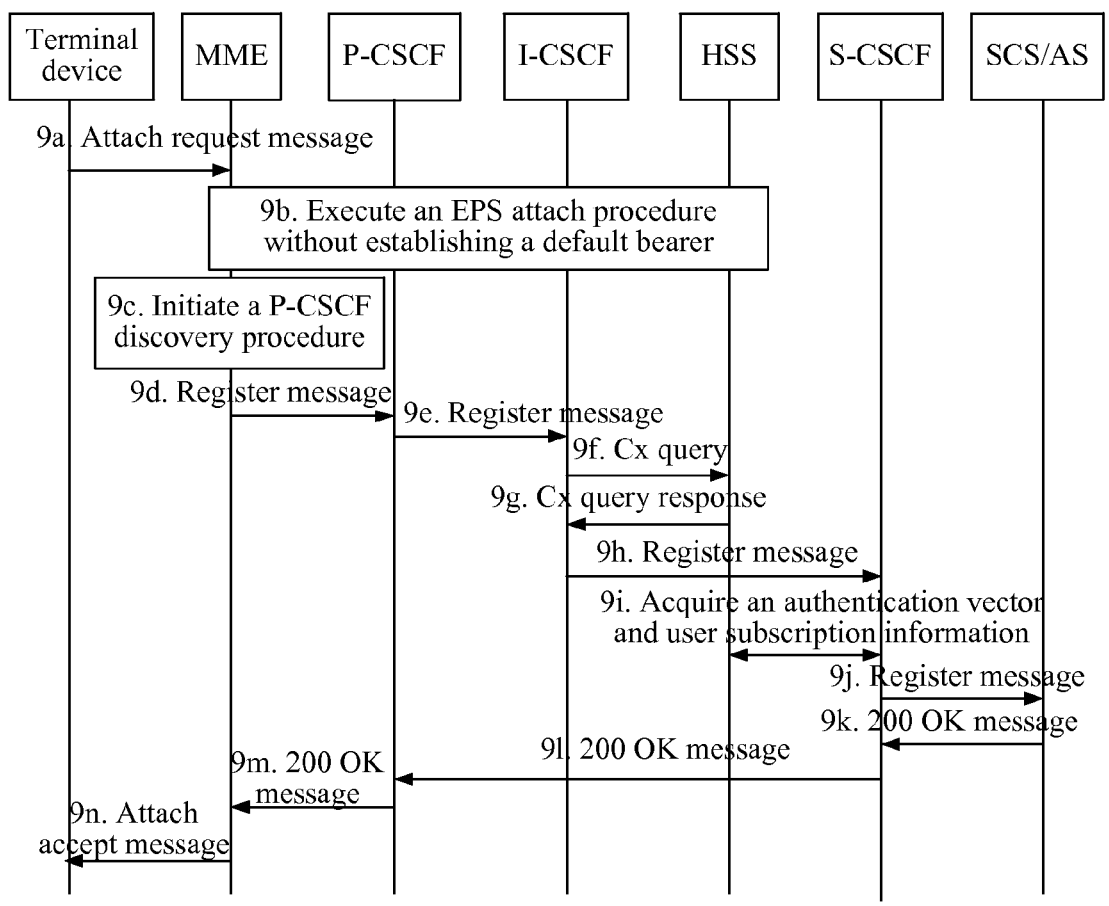
FIG. 9A is a flowchart of a registration method according to an embodiment of the present invention.

Before the foregoing small data transmission is performed, the terminal device needs to first register with the SCS/AS. An optional registration procedure is shown in FIG. 9A, and specifically includes the following steps.

Step 9*a*: A terminal device initiates an attach request message to an MME, where the attach request message carries an IMSI of the terminal device.

Step 9*b*: The MME executes an EPS attach procedure for the terminal device, where the attach procedure includes authentication, location update, and other operations, but no default bearer is created.

Optionally, in step 9*b*, the HSS may return, to the MME, a mapping relationship between the IMSI of the terminal device and a SIP identifier corresponding to the terminal device. In this implementation manner, the SIP identifier corresponding to the terminal device does not need to be stored on the terminal device, and it is only required that the mapping relationship between the IMSI of the terminal device and the SIP identifier corresponding to the terminal device be added to subscription data, and that the mapping relationship be stored on the HSS.

Optionally, the MME may generate, according to the IMSI of the terminal device, the SIP identifier corresponding to the terminal device.

Step 9*c*: The MME determines that the terminal device needs to perform IMS registration, and therefore initiates a P-CSCF discovery procedure.

Step 9*d*: The MME generates a first SIP registration request message by using the SIP identifier corresponding to the terminal device, and then encapsulates the first SIP registration request message into a register (REGISTER) message and sends the register (REGISTER) message to a P-CSCF discovered in the foregoing step, that is, initiates a SIP registration procedure. The first SIP registration request message includes the IMSI of the terminal device and the SIP identifier corresponding to the terminal device.

Step 9*e*: The P-CSCF determines, according to the SIP identifier corresponding to the terminal device, that the terminal device comes from a visited network and registration is required; therefore, the P-CSCF initiates, to a DNS server, DNS query of an I-CSCF address in a home network of the terminal device, and then sends the register (REGISTER) message to an I-CSCF according to a result of the DNS query.

A part of the SIP identifier corresponding to the terminal device is used to identify a network from which the terminal device comes (that is, stores a domain name corresponding to a network to which the terminal device belongs), and the P-CSCF further stores a domain name of an IMS network to which the P-CSCF belongs. Therefore, the P-CSCF can determine, according to the SIP identifier corresponding to the terminal device, whether the terminal device comes from the visited network. The so-called visited network refers to another network except the IMS network to which the P-CSCF belongs.

Step 9*f*: The I-CSCF sends a Cx query to the HSS.

Step 9*g*: The HSS checks a registration status of a user corresponding to the terminal device, and determines, according to the subscription data, whether the user is allowed to perform registration; the HSS returns a Cx query response, that is, returns a capability required by the S-CSCF, and the I-CSCF selects a proper S-CSCF according to a result returned by the HSS.

Step 9*h*: The I-CSCF sends the register (REGISTER) message to the foregoing selected S-CSCF.

Step 9*i*: After receiving the register (REGISTER) message, the S-CSCF interacts with the HSS by using a Cx interface, and acquires an authentication vector, user subscription information, and the like.

Step 9*j*: The S-CSCF sends the register (REGISTER) message to the AS and triggers registration with the SCS/AS.

Step 9*k*: After receiving the register (REGISTER) message, the SCS/AS returns a 200 ok message to the S-CSCF, so as to complete the registration.

The foregoing register message is a SIP signaling message and is equivalent to the foregoing second signaling message of the second type.

Step 9*l*: The S-CSCF returns the 200 ok message to the P-CSCF.

Step 9*m*: The P-CSCF returns the 200 ok message to the MME.

The foregoing 200 ok message carries a first SIP registration completion message, is a SIP signaling message, and is equivalent to the foregoing third signaling message of the second type.

Step 9*n*: The MME sends an attach accept message to the terminal device, where the attach accept message includes the first SIP registration completion message.

In this implementation manner, the attach procedure includes authentication, location update, and other operations, but no default bearer is created, that is, only a signaling connection exists between the terminal device and the MME. In this attach procedure, the MME, as a user agent (user agent), interacts with an IMS system and the AS, and takes the place of the terminal device to implement a procedure for registering with the application server. A process in which the MME takes the place of the terminal device to register with the application server causes no impact on interaction of signaling of the first type between the terminal device and the MME. This implementation manner lays a foundation for subsequent small data transmission.

Figure 9B:
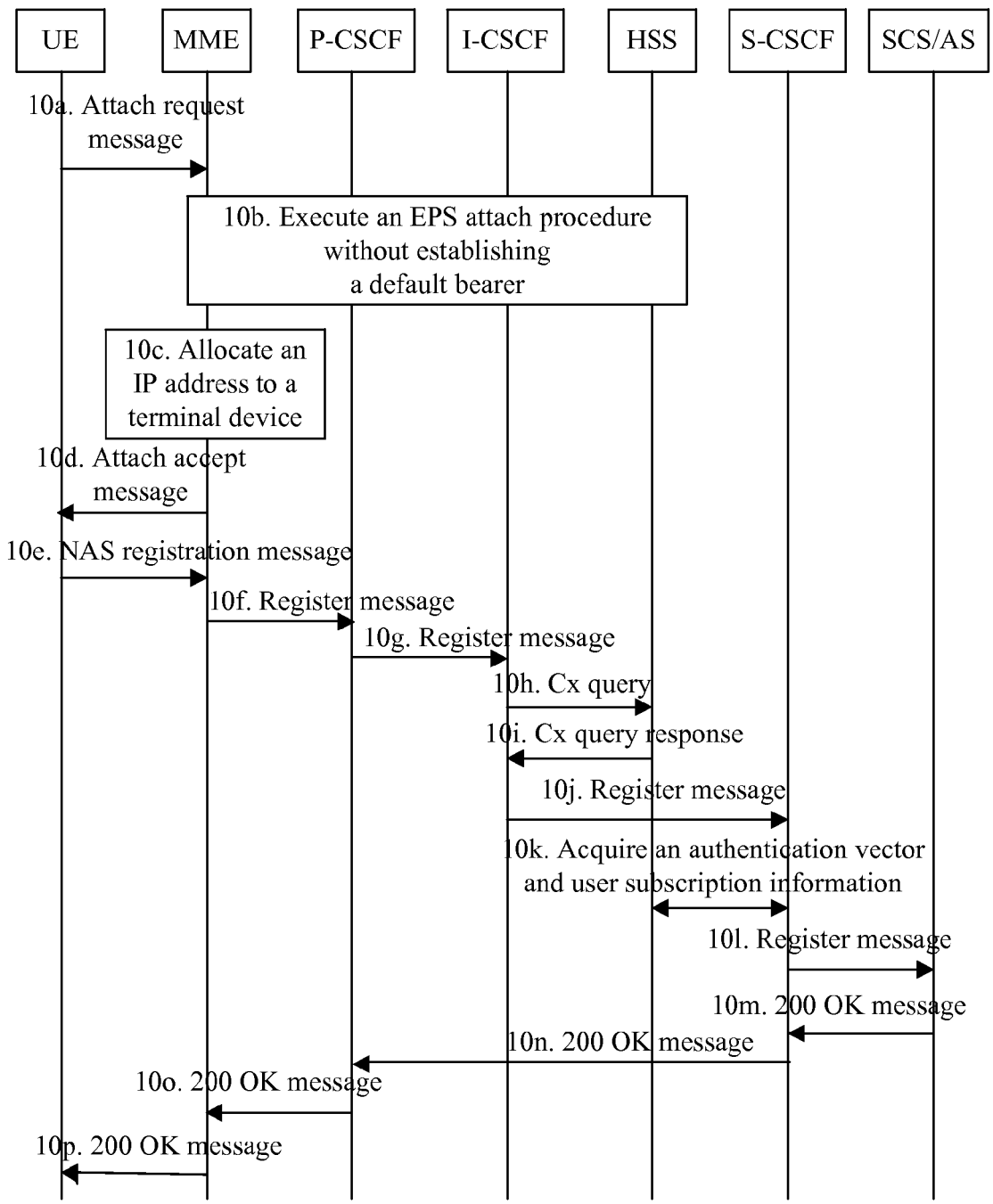
FIG. 9B is a flowchart of a registration method according to another embodiment of the present invention.

Another optional registration procedure is shown in FIG. 9B, and specifically includes the following steps.

Step 10a: A terminal device initiates an attach request message to an MME, where the attach request message carries an IMSI of the terminal device.

Step 10b: The MME executes an EPS attach procedure for the terminal device, where the attach procedure includes authentication, location update, and other operations, but no default bearer is created.

Step 10c: The MME allocates an IP address to the terminal device.

Step 10d: The MME sends an attach accept message to the terminal device, where the attach accept message carries the IP address that is allocated by the MME for the terminal device.

Step 10e: The terminal device, as a user agent (User Agent) of an IMS, generates a first SIP registration request message according to an IMSI of the terminal device and a corresponding SIP identifier that are locally stored, and encapsulates the first SIP registration request message into a NAS registration message and sends the NAS registration message to the MME. The NAS registration message includes the IP address that is allocated by the MME for the terminal device and an IP address of the MME.

The foregoing NAS registration message is a SIP signaling message and is equivalent to the foregoing second signaling message of the first type.

Step 10f: The MME extracts the first SIP registration request message from the NAS registration message, and encapsulates the first SIP registration request message into a register message and sends the register message to the P-CSCF.

Step 10g: The P-CSCF determines, according to the SIP identifier corresponding to the terminal device, that the terminal device comes from a visited network and registration is required; therefore, the P-CSCF initiates, to a DNS server, DNS query of an I-CSCF address in a home network of the terminal device, and then sends the register (REGISTER) message to an I-CSCF according to a result of the DNS query.

Step 10h: The I-CSCF sends a Cx query to the HSS.

Step 10i: The HSS checks a registration status of a user corresponding to the terminal device, and determines, according to the subscription data, whether the user is allowed to perform registration; the HSS returns a Cx query response, that is, returns a capability required by the S-CSCF, and the I-CSCF selects a proper S-CSCF according to a result returned by the HSS.

Step 10j: The I-CSCF sends the register (REGISTER) message to the foregoing selected S-CSCF.

Step 10k: After receiving the register (REGISTER) message, the S-CSCF interacts with the HSS by using a Cx interface, and acquires an authentication vector, user subscription information, and the like.

Step 10l: The S-CSCF sends the register (REGISTER) message to the AS and triggers registration with the SCS/AS.

Step 10m: After receiving the register (REGISTER) message, the SCS/AS returns a 200 ok message to the S-CSCF, so as to complete the registration.

The foregoing register message is a SIP signaling message and is equivalent to the foregoing second signaling message of the second type.

Step 10n: The S-CSCF returns the 200 ok message to the P-CSCF.

Step 10o: The P-CSCF returns the 200 ok message to the MME.

The foregoing 200 ok message carries a first SIP registration completion message, is a SIP signaling message, and is equivalent to the foregoing third signaling message of the second type.

Step 10p: The MME sends the 200 ok message to the terminal device, where the 200 ok message includes the first SIP registration completion message.

The 200 ok message in step 10p is a SIP signaling message, is encapsulated into the NAS signaling message, is sent by the MME to the terminal device, and is equivalent to the foregoing third signaling message of the first type.

In this implementation manner, the attach procedure includes authentication, location update, and other operations, but no default bearer is created, that is, only a signaling connection exists between the terminal device and the MME. In this attach procedure, the MME allocates the IP address to the terminal device. The terminal device pre-stores the SIP identifier corresponding to the terminal device. The terminal device itself, as a user agent (user agent), initiates a SIP registration procedure to the application server, and encapsulates the first SIP registration request message into a signaling message of the first type and sends the signaling message of the first type to the MME, and the first SIP registration request message is transmitted to the application server by using a signaling message of the second type between the MME and the P-CSCF, thereby implementing the SIP registration procedure, and laying a foundation for subsequent data transmission between the terminal device and the application server.

Figure 9C:
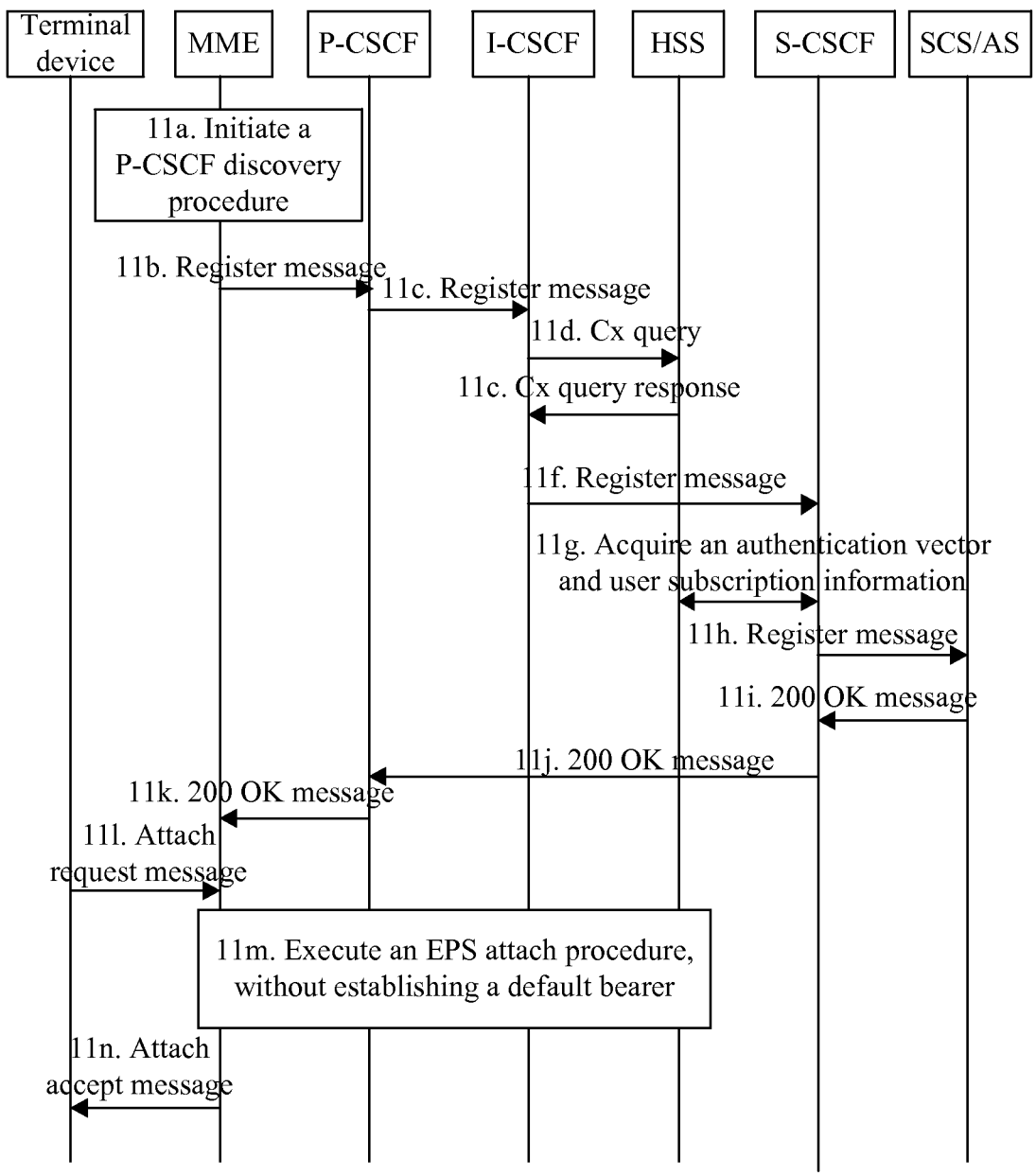
FIG. 9C is a flowchart of a registration method according to still another embodiment of the present invention.

Still another optional registration procedure is shown in FIG. 9C, and specifically includes the following steps.

Step 11a: The MME determines to perform IMS registration, and therefore initiates a P-CSCF discovery procedure.

Step 11b: The MME generates a second SIP registration request message by using a SIP identifier corresponding to the MME, and then encapsulates the second SIP registration request message into a register (REGISTER) message and sends the register (REGISTER) message to a P-CSCF discovered in the foregoing step, that is, initiates a SIP registration procedure. The second SIP registration request message includes an identifier of the MME and the SIP identifier corresponding to the MME.

Step 11c: The P-CSCF determines, according to the SIP identifier corresponding to the MME, that the MME comes from a visited network and registration is required; therefore, the P-CSCF initiates, to a DNS server, DNS query of an I-CSCF address in a home network of the MME, and then sends the register (REGISTER) message to an I-CSCF according to a result of the DNS query.

Step 11d: The I-CSCF sends a Cx query to the HSS.

Step 11e: The HSS checks a registration status of the MME, and determines, according to the subscription data, whether the MME is allowed to perform registration; the HSS returns a Cx query response, that is, returns a capability required by the S-CSCF, and the I-CSCF selects a proper S-CSCF according to a result returned by the HSS.

Step 11f: The I-CSCF sends the register (REGISTER) message to the foregoing selected S-CSCF.

Step 11g: After receiving the register (REGISTER) message, the S-CSCF interacts with the HSS by using a Cx interface, and acquires an authentication vector, user subscription information, and the like.

Step 11h: The S-CSCF sends the register (REGISTER) message to the AS and triggers registration with the SCS/AS.

Step 11i: After receiving the register (REGISTER) message, the SCS/AS returns a 200 ok message to the S-CSCF, so as to complete the registration.

The foregoing register message is a SIP signaling message and is equivalent to the foregoing second signaling message of the second type.

Step 11j: The S-CSCF returns the 200 ok message to the P-CSCF.

Step 11k: The P-CSCF returns the 200 ok message to the MME.

The foregoing 200 ok message carries a first SIP registration completion message, is a SIP signaling message, and is equivalent to the foregoing third signaling message of the second type.

Optionally, as shown in FIG. 9C, after step 11k, the following are further included:

Step 11l: The terminal device initiates an attach request message to the MME, where the attach request message carries an IMSI of the terminal device.

Step 11m: The MME executes an EPS attach procedure for the terminal device, where the attach procedure includes authentication, location update, and other operations, but no default bearer is created.

Step 11n: The MME sends an attach accept message to the terminal device.

The attach procedure described in step 11l to step 11n includes authentication, location update, and other operations, but no default bearer is created, that is, only a signaling connection exists between the terminal device and the MME.

In this implementation manner, the MME, as a user agent (user agent), interacts with an IMS system and the AS, and takes the place of the terminal device to implement a procedure for registering with the application server. A process in which the MME takes the place of the terminal device to register with the application server causes no impact on interaction of signaling of the first type between the terminal device and the MME. This implementation manner lays a foundation for subsequent small data transmission.

In an optional implementation manner, the small data transmission method further includes sending, by the SCS/AS, downlink data to the terminal device. Specifically, the S-CSCF queries routing information from the HSS and sends data to the MME, and the MME sends the data to the terminal device by using a NAS signaling message.

Figure 9D:
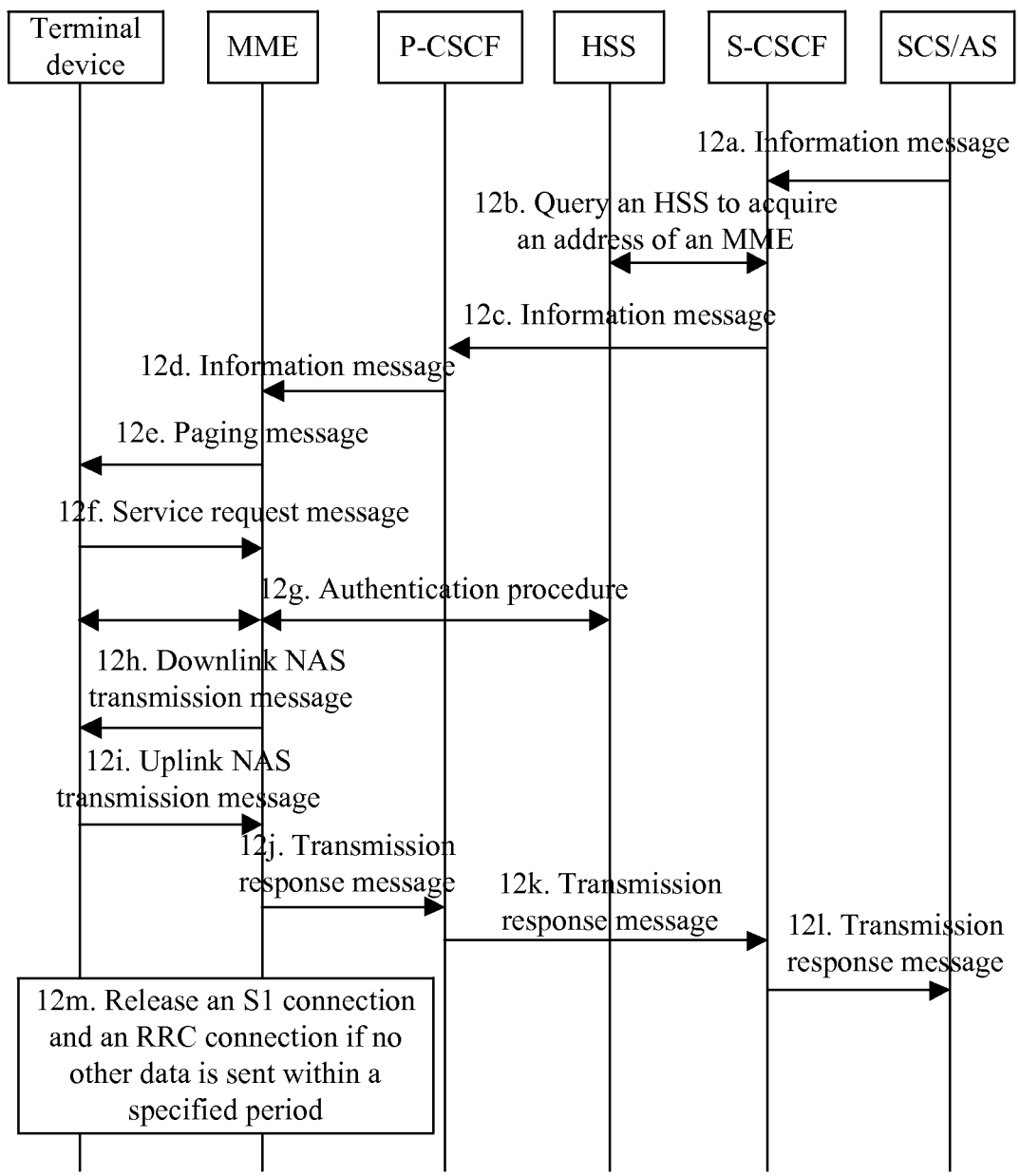
FIG. 9D is a flowchart of a small data transmission method according to another embodiment of the present invention.

With reference to the registration procedure shown in FIG. 9C, a process of transmitting downlink data is shown in FIG. 9D, and the process includes the following steps.

Step 12a: The SCS/AS sends an information message (MESSAGE) to the S-CSCF, where the information message (MESSAGE) carries downlink data, where the downlink data carries a SIP identifier corresponding to the terminal device.

After the MME implements the registration procedure, and the terminal device implements the EPS attach procedure, the SCS/AS encapsulates the downlink data to be sent to the terminal device into the information message (MESSAGE) and sends the information message (MESSAGE) to the S-CSCF.

Step 12b: The S-CSCF queries the HSS according to the SIP identifier corresponding to the terminal device, acquires an identifier of the terminal device from a mapping relationship, on the HSS, between an IMSI of the terminal device and the SIP identifier corresponding to the terminal device, and further acquires an address of the MME from a mapping relationship, on the HSS, between the identifier of the terminal device and the address of the MME.

Step 12c: The S-CSCF sends the information message (MESSAGE) and the address of the MME to the P-CSCF according to a query result.

Step 12d: The P-CSCF forwards the information message (MESSAGE) to the MME according to the address of the MME.

In this implementation manner, the foregoing information message (MESSAGE) is a SIP signaling message and is equivalent to the foregoing fourth signaling message of the second type.

Step 12e: The MME queries the HSS according to the SIP identifier corresponding to the terminal device, acquires the IMSI of the terminal device from the mapping relationship, on the HSS, between the IMSI of the terminal device and the SIP identifier corresponding to the terminal device, and sends a paging message to the terminal device, where the paging message carries a small data transmission indication.

Step 12f: The terminal device sends a service request message to the MME, so as to establish a signaling connection.

Step 12g: The terminal device implements an authentication procedure with the MME, the HSS, and the like.

Step 12h: The MME extracts, from the received information message (MESSAGE), downlink data to be sent, and encapsulates the downlink data into a downlink NSA transmission message and sends the downlink NSA transmission message to the terminal device.

The downlink NSA transmission message in step 12h is a NAS signaling message and is equivalent to the foregoing fourth signaling message of the first type.

Step 12i: The terminal device encapsulates a transmission response message into an uplink NAS transmission message and sends the uplink NAS transmission message to the MME.

Step 12j: The MME sends the transmission response message to the P-CSCF.

Step 12k: The P-CSCF sends the transmission response message to the S-CSCF.

Step 12l: The S-CSCF sends the transmission response message to the SCS/AS.

Step 12m: If no other data is sent within a specified period, the base station releases an RRC connection between the base station and the terminal device and an S1 signaling connection between the base station and the MME.

In the foregoing embodiment, both uplink data and downlink data between a terminal device and an application server are transmitted by using a signaling message between an MME and a P-CSCF and a signaling message between the MME and the terminal device, so that there is no need to establish a user plane RAB for the terminal device again, which saves a network resource, reduces a burden on a network, and further helps increase a data transmission rate.

Figure 10:
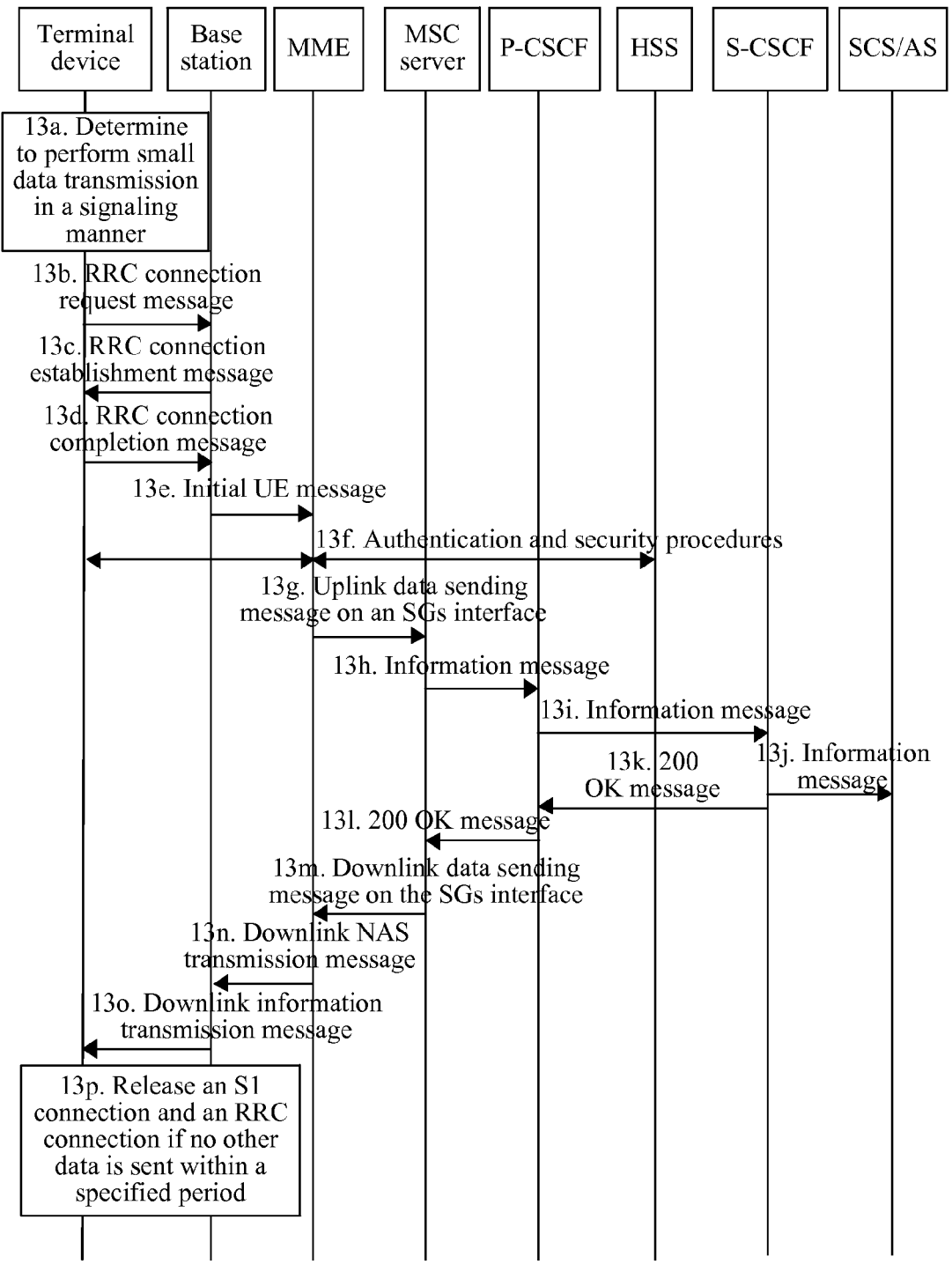
FIG. 10 is a flowchart of a small data transmission method according to still another embodiment of the present invention.

Further, if an MME and a P-CSCF are connected by using an MSC server, interaction between the MME and the P-CSCF is implemented by using the MSC server. The following is described by using an example in which a terminal device sends uplink data to an SCS/AS. A process in which the SCS/AS sends downlink data to the terminal device may be easily learned by persons skilled in the art according to descriptions of related embodiments of the present invention. As shown in FIG. 10, another small data transmission procedure includes the following steps.

Step 13a: The terminal device determines whether uplink data to be sent is small data, and when determining that the uplink data to be sent is small data, determines to send the small data in a signaling manner.

Step 13b: The terminal device sends an RRC connection request message to a base station, so as to request to establish an RRC connection, where an information element "establishment cause" carried in the RRC connection request message instructs the base station to establish a signaling connection only for the terminal device.

Step 13c: The base station sends an RRC connection establishment message to the terminal device, so as to instruct the terminal device to establish the RRC connection.

Step 13d: The terminal device sends an RRC connection completion message to the base station, where the RRC connection completion message carries a NAS PDU, and the uplink data to be sent is encapsulated into the NAS PDU.

Step 13e: The base station sends the NAS PDU to an MME by using an initial UE message.

Step 13f: The terminal device performs authentication and security procedures with the MME, an HSS, and the like by using the base station.

This process pertains to the prior art, and details are not described herein again.

Step 13g: The MME acquires the uplink data from the initial UE message, and encapsulates the uplink data into an uplink data sending message on an SGs interface and sends, by using the SGs interface between the MME and the MSC server, the uplink data sending message to the MSC server.

Step 13h: The MSC server acquires the uplink data from the uplink data sending message on the SGs interface, and encapsulates the uplink data into an information message (MESSAGE) and sends the information message (MESSAGE) to the P-CSCF.

Step 13i: The P-CSCF forwards the information message (MESSAGE) to an S-CSCF.

Step 13j: The S-CSCF triggers, based on initial filter criteria, transmission of the information message (MESSAGE) to the SCS/AS.

Step 13k: The S-CSCF sends an OK message to the P-CSCF.

Step 13l: The P-CSCF forwards the OK message to the MSC server.

Step 13m: The MSC server encapsulates the OK message into a downlink data sending message on the SGs interface and sends the downlink data sending message to the MME.

Step 13n: The MME sends the OK message to the base station by using a downlink NAS transmission message.

Step 13o: The base station transfers the OK message to the terminal device by using a downlink information transmission message.

Step 13p: If no other data is sent within a specified period, the base station releases an RRC connection between the base station and the terminal device and an S1 signaling connection between the base station and the MME.

It can be learned from the foregoing description that, by using interconnection between an existing MSC server and the MME and interconnection between the MSC server and the P-CSCF, modifications of the MME may be reduced, so that the MME does not need to support the SIP protocol.

In addition, beneficial effects brought by the foregoing embodiments are as follows: An IMS system capability, subscription, an identifier, and the like may be reused, which resolves problems such as roaming and charging for an MTC terminal, and facilitates use of an external identifier of the MTC terminal and interaction with an application server.

Figure 11:
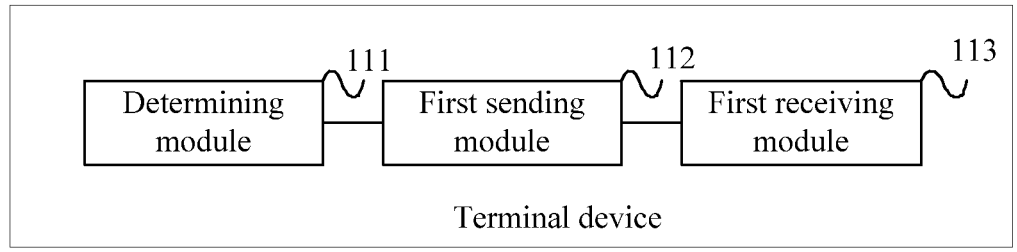
FIG. 11 is a schematic structural diagram of a terminal device according to an embodiment of the present invention.

FIG. 11 is a schematic structural diagram of a terminal device according to an embodiment of the present invention. As shown in FIG. 11, the terminal device in this embodiment includes a determining module 111, a first sending module 112, and a first receiving module 113.

The determining module 111 is configured to determine whether a data volume of uplink data to be sent is less than a preset data volume threshold.

The first sending module 112, which is connected to the determining module 111, is configured to send an RRC connection request message to a base station when the determining module 111 determines that the data volume of the uplink data is less than the preset data volume threshold, where the RRC connection request message includes indication information that instructs the base station to establish a signaling connection only for the terminal device.

The first receiving module 113 is configured to, after the first sending module 112 sends the RRC connection request message, receive an RRC connection establishment message sent by the base station. Optionally, the first receiving module 113 is connected to the first sending module 112.

In addition, the first sending module 112 in this embodiment is further configured to, after the first receiving module 113 receives the RRC connection establishment message, carry the uplink data in an RRC connection completion message and send the RRC connection completion message to the base station, so that the base station sends the uplink data to an MME according to the indication information and by using a first signaling message of a first type between the base station and the MME, so that the MME sends the uplink data to an application server corresponding to the uplink data by using a first signaling message of a second type between the MME and a P-CSCF.

In an optional implementation manner of this embodiment, the first sending module 112 is further configured to send an attach request message to the MME before the determining module 111 determines whether the data volume of the uplink data to be sent is less than the preset data volume threshold, so that the MME sends a first SIP registration request message to the application server by using a second signaling message of the second type between the MME and the P-CSCF, where the attach request message includes an identifier of the terminal device, and the first SIP registration request message includes the identifier of the terminal device and a SIP identifier corresponding to the terminal device.

The first receiving module 113 is further configured to, after the first sending module 112 sends the attach request message to the MME, receive an attach accept message sent by the MME, where the attach accept message is generated by the MME after the MME receives, by using a third signaling message of the second type between the MME and the P-CSCF, a first SIP registration completion message returned by the application server, and the first SIP registration completion message is returned by the application server after the application server receives the SIP identifier corresponding to the terminal device.

In this implementation manner, in a process in which the terminal device in this embodiment performs EPS attach by using the first sending module 112 and the first receiving module 113, it is implemented that the MMS takes the place of the terminal device in this embodiment as a user agent to implement a procedure for SIP registration with the application server. Only a signaling connection exists between the terminal device and the MME in this embodiment.

In an optional implementation manner of this embodiment, the first sending module 112 is further configured to send an attach request message to the MME before the determining module 111 determines whether the data volume of the uplink data to be sent is less than the preset data volume threshold, where the attach request message includes an identifier of the terminal device; and the first sending module 112 is configured to, after the first receiving module 113 receives an attach accept message sent by the MME, send, according to an IP address that is in the attach accept message and allocated by the MME for the terminal device, a first SIP registration request message to the MME by using a second signaling message of the first type between the terminal device and the MME, so that the MME sends the first SIP registration request message to the application server by using a second signaling message of the second type between the MME and the P-CSCF, where the first SIP registration request message includes the identifier of the terminal device and a SIP identifier corresponding to the terminal device.

The first receiving module 113 is further configured to, after the first sending module 112 sends the attach request message to the MME, receive the attach accept message sent by the MME, where the attach accept message includes the IP address that is allocated by the MME for the terminal device; and the first receiving module 113 is configured to, after the first sending module 112 sends the first SIP registration request message to the MME, receive, by using a third signaling message of the first type between the terminal device and the MME, a first SIP registration completion message returned by the MME, where the first SIP registration completion message is returned by the application server after the application server receives the SIP identifier corresponding to the terminal device, and the MME receives the first SIP registration completion message by using a third signaling message of the second type between the MME and the P-CSCF.

In this implementation manner, in an EPS attach process, the terminal device in this embodiment as a user agent implements, by using the first sending module 112 and the first receiving module 113, a procedure for SIP registration with the application server. Only a signaling connection exists between the terminal device in this embodiment and the MME.

In an optional implementation manner of this embodiment, the first sending module 112 is further configured to send an attach request message to the MME before the determining module 111 determines whether the data volume of the uplink data to be sent is less than the preset data volume threshold, where the attach request message includes an identifier of the terminal device.

The first receiving module 113 is further configured to, after the first sending module 112 sends the attach request message to the MME, receive an attach accept message sent by the MME.

In this implementation manner, the terminal device in this embodiment implements an EPS attach procedure by using the first sending module 112 and the first receiving module 113, and no default bearer is established in an EPS attach process, that is, only a signaling connection exists between the terminal device in this embodiment and the MME. The MME directly serves as a user agent to perform SIP registration with the application server.

In an optional implementation manner of this embodiment, the first receiving module 113 is further configured to receive a paging message sent by the MME, and receive a fourth signaling message that is of the first type and sent by the MME according to a service request message sent by the first sending module 112. The paging message is generated by the MME after the MME receives, by using a fourth signaling message of the second type between the MME and the P-CSCF, downlink data that is sent by the application server to the terminal device, where the fourth signaling message of the first type includes the downlink data.

The first sending module 112 is further configured to send the service request message to the MME after the first receiving module 113 receives the paging message, where the service request message is used to instruct the MME to establish a signaling connection only for the terminal device.

Functional modules of the terminal device provided in this embodiment may be configured to implement a procedure of the foregoing data transmission method described from the perspective of the terminal device. A specific operating principle thereof is not described again, and reference may be made to the description of the method embodiment for details.

The terminal device in this embodiment performs small data transmission based on a signaling message of a first type between an MME and the terminal device, and a signaling message of a second type between the MME and a P-CSCF. There is no need to specially establish or restore a user plane RAB between the terminal device and a network air interface side, which saves a network resource, improves small data transmission efficiency, reduces signaling interaction between the terminal device and a network side, and reduces network load.

Figure 12:
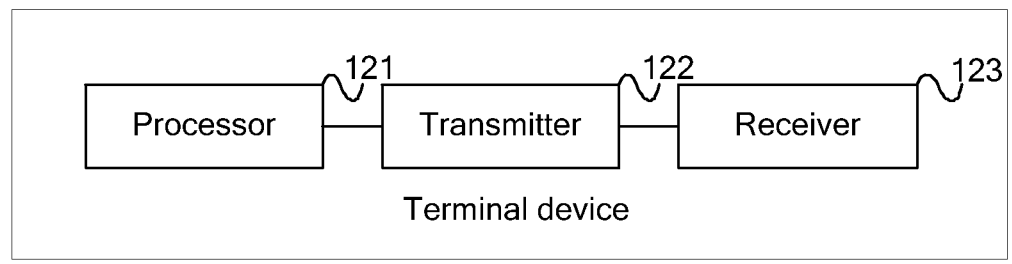
FIG. 12 is a schematic structural diagram of a terminal device according to another embodiment of the present invention.

FIG. 12 is a schematic structural diagram of a terminal device according to another embodiment of the present invention. As shown in FIG. 12, the terminal device in this embodiment includes a processor 121, a transmitter 122, and a receiver 123.

The processor 121 is configured to determine whether a data volume of uplink data to be sent is less than a preset data volume threshold.

The transmitter 122, which is connected to the processor 121, is configured to send an RRC connection request message to a base station when the processor 121 determines that the data volume of the uplink data is less than the preset data volume threshold, where the RRC connection request message includes indication information that instructs the base station to establish a signaling connection only for the terminal device.

The receiver 123 is configured to, after the transmitter 122 sends the RRC connection request message, receive an RRC connection establishment message sent by the base station. Optionally, the transmitter 122 is connected to the receiver 123.

The transmitter 122 is further configured to, after the receiver 123 receives the RRC connection establishment message, carry the uplink data in an RRC connection completion message and send the RRC connection completion message to the base station, so that the base station sends the uplink data to an MME according to the indication information and by using a first signaling message of a first type between the base station and the MME, so that the MME sends the uplink data to an application server corresponding to the uplink data by using a first signaling message of a second type between the MME and a P-CSCF.

The terminal device provided in this embodiment may be configured to implement a procedure of the foregoing data transmission method described from the perspective of the terminal device. A specific operating principle thereof is not described again, and reference may be made to the description of the method embodiment for details.

The terminal device in this embodiment performs small data transmission based on a signaling message of a first type between an MME and the terminal device, and a signaling message of a second type between the MME and a P-CSCF. There is no need to specially establish or restore a user plane RAB between the terminal device and a network air interface side, which saves a network resource, improves small data transmission efficiency, reduces signaling interaction between the terminal device and a network side, and reduces network load.

Figure 13:
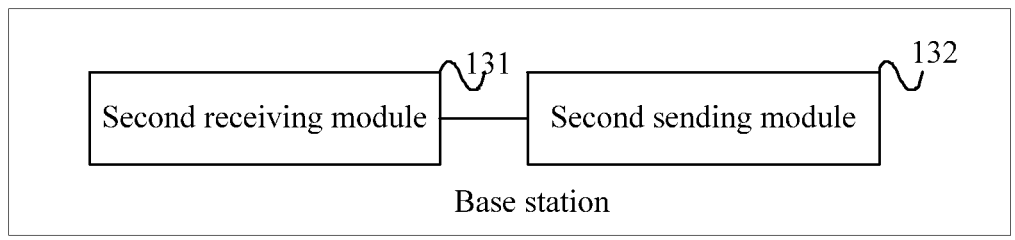
FIG. 13 is a schematic structural diagram of a base station according to an embodiment of the present invention.

FIG. 13 is a schematic structural diagram of a base station according to an embodiment of the present invention. As shown in FIG. 13, the base station in this embodiment includes a second receiving module 131 and a second sending module 132.

The second receiving module 131 is configured to receive an RRC connection request message sent by a terminal device, and receive, after the second sending module 132 sends an RRC connection establishment message to the terminal device, an RRC connection completion message sent by the terminal device, where the RRC connection request message is generated by the terminal device when the terminal device determines that a data volume of uplink data to be sent is less than a preset data volume threshold, the RRC connection request message includes indication information that instructs the base station to establish a signaling connection only for the terminal device, and the RRC connection completion message includes the uplink data. Optionally, the second receiving module 131 is connected to the second sending module 132.

The second sending module 132 is configured to: send the RRC connection establishment message to the terminal device after the second receiving module 131 receives the RRC connection request message; and after the second receiving module 131 receives the RRC connection completion message, send the uplink data to an MME according to the indication information and by using a first signaling message of a first type between the base station and the MME, so that the MME sends the uplink data to an application server corresponding to the uplink data by using a first signaling message of a second type between the MME and a P-CSCF.

Functional modules of the base station provided in this embodiment may be configured to implement a procedure of the foregoing data transmission method described from the perspective of the base station. A specific operating principle thereof is not described again, and reference may be made to the description of the method embodiment for details.

The base station in this embodiment, in collaboration with the terminal device provided in the foregoing embodiment, performs small data transmission based on a signaling message of a first type between an MME and the terminal device, and a signaling message of a second type between the MME and a P-CSCF. There is no need to specially establish or restore a user plane RAB between the terminal device and a network air interface side, which saves a network resource, improves small data transmission efficiency, reduces signaling interaction between the terminal device and a network side, and reduces network load.

Figure 14:
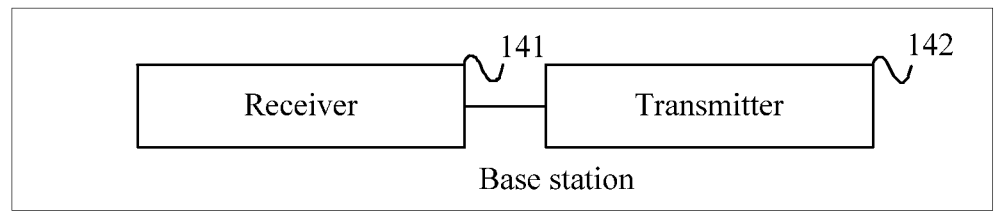
FIG. 14 is a schematic structural diagram of a base station according to another embodiment of the present invention.

FIG. 14 is a schematic structural diagram of a base station according to another embodiment of the present invention. As shown in FIG. 14, the base station in this embodiment includes a receiver 141 and a transmitter 142.

The receiver 141 is configured to receive an RRC connection request message sent by a terminal device, and receive, after the transmitter 142 sends an RRC connection establishment message to the terminal device, an RRC connection completion message sent by the terminal device, where the RRC connection request message is generated by the terminal device when the terminal device determines that a data volume of uplink data to be sent is less than a preset data volume threshold, the RRC connection request message includes indication information that instructs the base station to establish a signaling connection only for the terminal device, and the RRC connection completion message includes the uplink data.

The transmitter 142 is configured to: send the RRC connection establishment message to the terminal device after the receiver 141 receives the RRC connection request message; and after the receiver 141 receives the RRC connection completion message, send the uplink data to an MME according to the indication information and by using a first signaling message of a first type between the base station and the MME, so that the MME sends the uplink data to an application server corresponding to the uplink data by using a first signaling message of a second type between the MME and a P-CSCF.

The base station provided in this embodiment may be configured to implement a procedure of the foregoing data transmission method described from the perspective of the base station. A specific operating principle thereof is not described again, and reference may be made to the description of the method embodiment for details.

The base station in this embodiment, in collaboration with the terminal device provided in the foregoing embodiment, performs small data transmission based on a signaling message of a first type between an MME and the terminal device, and a signaling message of a second type between the MME and a P-CSCF. There is no need to specially establish or restore a user plane RAB between the terminal device and a network air interface side, which saves a network resource, improves small data transmission efficiency, reduces signaling interaction between the terminal device and a network side, and reduces network load.

Figure 15:
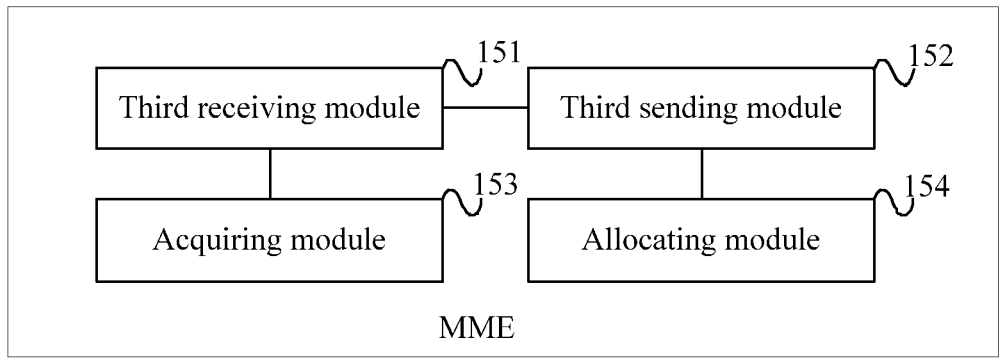
FIG. 15 is a schematic structural diagram of an MME according to an embodiment of the present invention.

FIG. 15 is a schematic structural diagram of an MME according to an embodiment of the present invention. As shown in FIG. 15, the MME in this embodiment includes a third receiving module 151 and a third sending module 152.

The third receiving module 151 is configured to receive a first signaling message of a first type sent by a base station, where the first signaling message of the first type is generated, according to indication information in an RRC connection request message sent by a terminal device, by the base station after the base station receives an RRC connection completion message sent by the terminal device, where the RRC connection completion message includes uplink data that is sent by the terminal device to an application server, the first signaling message of the first type includes the uplink data, and the indication information is used to instruct the base station to establish a signaling connection only for the terminal device.

The third sending module 152, which is connected to the third receiving module 151, is configured to send, to the application server by using a first signaling message of a second type between the MME and a P-CSCF, the uplink data received by the third receiving module 151.

In an optional implementation manner of this embodiment, the third receiving module 151 is further configured to: before receiving the first signaling message of the first type, receive an attach request message sent by the terminal device; and after the third sending module 152 sends a first SIP registration request message to the application server, receive, by using a third signaling message of the second type between the MME and the P-CSCF, a first SIP registration completion message returned by the application server after a SIP identifier corresponding to the terminal device is received, where the attach request message includes an identifier of the terminal device.

Based on the foregoing description, the MME in this embodiment further includes an acquiring module 153.

The acquiring module 153 is configured to acquire, according to the identifier of the terminal device, the SIP identifier corresponding to the terminal device, and generate the first SIP registration request message, where the first SIP registration request message includes the identifier of the terminal device and the SIP identifier corresponding to the terminal device.

Optionally, that the acquiring module 153 is configured to acquire, according to the identifier of the terminal device, the SIP identifier corresponding to the terminal device includes the acquiring module 153 is specifically configured to: send a location update request message to an HSS, where the location update request message includes the identifier of the terminal device; and receive a mapping relationship between the identifier of the terminal device and the SIP identifier corresponding to the terminal device, where the mapping relationship is returned by the HSS according to the identifier of the terminal device; or the acquiring module 153 is specifically configured to generate, according to the identifier of the terminal device, the SIP identifier corresponding to the terminal device; the acquiring module 153 is connected to the third receiving module 151, and is configured to provide the SIP identifier corresponding to the terminal device to the third receiving module 151.

Correspondingly, the third sending module 152 is further configured to send the first SIP registration request message to the application server by using a second signaling message of the second type between the MME and the P-CSCF, and send an attach accept message to the terminal device after the third receiving module 151 receives the first SIP registration completion message, where the attach accept message includes the first SIP registration completion message.

In this implementation manner, in an EPS attach procedure of the terminal device, it is implemented that, by using the third receiving module 151, the third sending module 152, and the acquiring module 153, the MME in this embodiment takes the place of the terminal device to implement a procedure for SIP registration with the application server. Only a signaling connection exists between the MME in this embodiment and the terminal device.

In an optional implementation manner of this embodiment, the third receiving module 151 is further configured to: before receiving the first signaling message of the first type, receive an attach request message sent by the terminal device; after the third sending module 152 sends an attach accept message to the terminal device, receive a second signaling message that is of the first type and sent by the terminal device according to an IP address allocated by the MME for the terminal device; and after the third sending module 152 sends a first SIP registration request message to the application server, receive a first SIP registration completion message returned by the application server after a SIP identifier corresponding to the terminal device is received, where the attach request message includes an identifier of the terminal device, the second signaling message of the first type includes the first SIP registration request message, and the first SIP registration request message includes the identifier of the terminal device and the SIP identifier corresponding to the terminal device.

Based on the foregoing description, the MME in this embodiment further includes an allocating module 154. The allocating module 154 is configured to allocate the IP address to the terminal device.

Correspondingly, the third sending module 152 is further configured to: send the attach accept message to the terminal device after the third receiving module 151 receives the attach request message, where the attach accept message includes the foregoing IP address; after the third receiving module 151 receives the second signaling message of the first type, send the first SIP registration request message to the application server by using a second signaling message of the second type between the MME and the P-CSCF; and send a third signaling message of the first type to the terminal device after the third receiving module 151 receives the first SIP registration completion message, where the third signaling message of the first type includes the first SIP registration completion message. Optionally, the allocating module 154 is connected to the third sending module 152, and is configured to provide, to the third sending module 152, the IP address that is allocated by the MME for the terminal device.

In this implementation manner, by using the third receiving module 151, the third sending module 152, and the allocating module 154, the MME in this embodiment implements an EPS attach procedure of the terminal device and enables the terminal device to implement a procedure for SIP registration with the application server. Only a signaling connection exists between the MME in this embodiment and the terminal device.

In an optional implementation manner of this embodiment, the third sending module 152 is further configured to, before the third receiving module 151 receives the first signaling message of the first type, send a second SIP registration request message to the P-CSCF by using a second signaling message of the second type between the MME and the P-CSCF, so that the P-CSCF sends the second SIP registration request message to the application server, where the second signaling message of the second type includes the second SIP registration request message, and the second SIP registration request message includes an identifier of the MME and a SIP identifier corresponding to the MME.

The third receiving module 151 is further configured to, after the third sending module 152 sends the second SIP registration request message, receive, by using a third signaling message of the second type between the MME and the P-CSCF, a second SIP registration completion message that is returned by the application server after the application server receives the SIP identifier corresponding to the MME.

Based on the foregoing description, the third receiving module 151 is further configured to, after receiving the second SIP registration completion message, receive an attach request message sent by the terminal device, where the attach request message includes the identifier of the terminal device.

The third sending module 152 is further configured to send an attach accept message to the terminal device after the third receiving module 151 receives the attach request message.

In this implementation manner, by using the third receiving module 151 and the third sending module 152, the MME in this embodiment implements an EPS attach procedure of the terminal device, and serves as a user agent to implement a procedure for SIP registration with the application server. Only a signaling connection exists between the MME in this embodiment and the terminal device.

In an optional implementation manner of this embodiment, the third receiving module 151 is further configured to: receive, by using a fourth signaling message of the second type between the MME and the P-CSCF, downlink data that is sent by the application server to the terminal device; and after the third sending module 152 sends a paging message to the terminal device, receive a service request message sent by the terminal device.

The third sending module 152 is further configured to: send the paging message to the terminal device after the third receiving module 151 receives the downlink data; and after the third receiving module 151 receives the service request message, send a fourth signaling message of the first type to the terminal device, where the fourth signaling message of the first type includes the downlink data.

In an optional implementation manner of this embodiment, that the third sending module 152 is configured to send the uplink data to the application server by using a first signaling message of a second type between the MME and a P-CSCF includes the third sending module 152 is specifically configured to send a first signaling message of a third type to an MSC server, where the first signaling message of the third type includes the uplink data, so that the MSC server encapsulates the uplink data into the first signaling message of the second type and sends the first signaling message of the second type to the P-CSCF, so as to send the uplink data to the application server.

Correspondingly, that the third receiving module 151 is configured to receive, by using a fourth signaling message of the second type between the MME and the P-CSCF, downlink data that is sent by the application server to the terminal device includes the third receiving module 151 is specifically configured to receive a second signaling message of the third type sent by the MSC server, where the second signaling message of the third type is generated by the MSC server according to the fourth signaling message that is of the second type and sent by the P-CSCF, and the second signaling message of the third type includes the downlink data.

Functional modules of the MME provided in this embodiment may be configured to implement a procedure of the foregoing data transmission method described from the perspective of the MME. A specific operating principle thereof is not described again, and reference may be made to the description of the method embodiment for details.

The MME in this embodiment, in collaboration with the terminal device and the base station provided in the foregoing embodiments, performs small data transmission based on a signaling message of a first type between the MME and the terminal device, and a signaling message of a second type between the MME and a P-CSCF. There is no need to specially establish or restore a user plane RAB between the terminal device and a network air interface side, which saves a network resource, improves small data transmission efficiency, reduces signaling interaction between the terminal device and a network side, and reduces network load.

Figure 16:
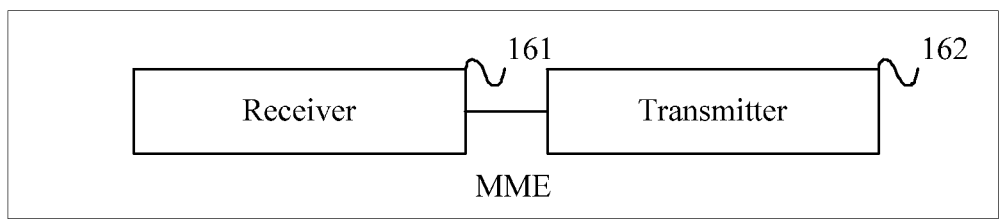
FIG. 16 is a schematic structural diagram of an MME according to another embodiment of the present invention.

FIG. 16 is a schematic structural diagram of an MME according to another embodiment of the present invention. As shown in FIG. 16, the MME in this embodiment includes a receiver 161 and a transmitter 162.

The receiver 161 is configured to receive a first signaling message of a first type sent by a base station, where the first signaling message of the first type is generated, according to indication information in an RRC connection request message sent by a terminal device, by the base station after the base station receives an RRC connection completion message sent by the terminal device, where the RRC connection completion message includes uplink data that is sent by the terminal device to an application server, the first signaling message of the first type includes the uplink data, and the indication information is used to instruct the base station to establish a signaling connection only for the terminal device.

The transmitter 162, which is connected to the receiver 161, is configured to send, to the application server by using a first signaling message of a second type between the MME and a P-CSCF, the uplink data received by the receiver 161.

The MME provided in this embodiment may be configured to implement a procedure of the foregoing data transmission method described from the perspective of the MME. A specific operating principle thereof is not described again, and reference may be made to the description of the method embodiment for details.

The MME in this embodiment, in collaboration with the terminal device and the base station provided in the foregoing embodiments, performs small data transmission based on a signaling message of a first type between the MME and the terminal device, and a signaling message of a second type between the MME and a P-CSCF. There is no need to specially establish or restore a user plane RAB between the terminal device and a network air interface side, which saves a network resource, improves small data transmission efficiency, reduces signaling interaction between the terminal device and a network side, and reduces network load.

Figure 17:
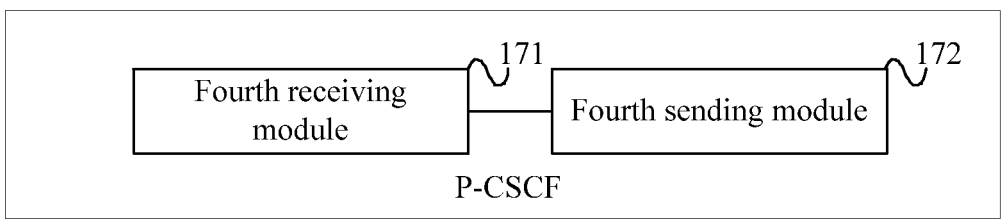
FIG. 17 is a schematic structural diagram of a P-CSCF according to an embodiment of the present invention.

FIG. 17 is a schematic structural diagram of a P-CSCF according to an embodiment of the present invention. As shown in FIG. 17, the P-CSCF in this embodiment includes a fourth receiving module 171 and a fourth sending module 172.

The fourth receiving module 171 is configured to receive, by using a first signaling message of a second type between the P-CSCF and an MME, uplink data that is sent by a terminal device to an application server, where the first signaling message of the second type is generated by the MME according to the uplink data in a first signaling message of a first type after the MME receives the first signaling message of the first type sent by a base station, the first signaling message of the second type includes the uplink data, and a data volume of the uplink data is less than a preset data volume threshold.

The fourth sending module 172, which is connected to the fourth receiving module 171, is configured to send, to an S-CSCF, the uplink data received by the fourth receiving module 171, so that the S-CSCF sends the uplink data to the application server.

In an optional implementation manner of this embodiment, the fourth receiving module 171 is further configured to: before receiving the uplink data, receive, by using a second signaling message of the second type between the P-CSCF and the MME, a first SIP registration request message sent by the MME; and after the fourth sending module sends the first SIP registration request message to the application server, receive a first SIP registration completion message that is sent by the S-CSCF and returned by the application server after a SIP identifier corresponding to the terminal device is received, where the first SIP registration request message includes an identifier of the terminal device and the SIP identifier corresponding to the terminal device.

The fourth sending module 172 is further configured to: send the first SIP registration request message to the S-CSCF after the fourth receiving module 171 receives the first SIP registration request message, so that the S-CSCF sends the first SIP registration request message to the application server; and after the fourth receiving module 171 receives the first SIP registration completion message, send the first SIP registration completion message to the MME by using a third signaling message of the second type between the P-CSCF and the MME.

In an optional implementation manner of this embodiment, the fourth receiving module 171 is further configured to: before receiving the uplink data, receive, by using a second signaling message of the second type between the P-CSCF and the MME, a second SIP registration request message sent by the MME; and after the fourth sending module 172 sends the second SIP registration request message to the S-CSCF, receive a second SIP registration completion message that is sent by the S-CSCF and returned by the application server after a SIP identifier corresponding to the MME is received, where the second SIP registration request message includes an identifier of the MME and the SIP identifier corresponding to the MME.

The fourth sending module 172 is further configured to: send the second SIP registration request message to the S-CSCF after the fourth receiving module 171 receives the second SIP registration request message, so that the S-CSCF sends the second SIP registration request message to the application server; and after the fourth receiving module 171 receives the second SIP registration completion message, send the second SIP registration completion message to the MME by using a third signaling message of the second type between the P-CSCF and the MME.

In an optional implementation manner of this embodiment, the fourth receiving module 171 is further configured to receive address information of the MME and downlink data that are sent by the S-CSCF, where the downlink data is sent by the application server to the terminal device, and the address information of the MME is acquired by the S-CSCF by querying, according to a SIP identifier corresponding to the terminal device, an HSS, where the HSS stores a mapping relationship between an identifier of the terminal device and the SIP identifier corresponding to the terminal device, and a mapping relationship between the identifier of the terminal device and the address information of the MME.

The fourth sending module 172 is further configured to, after the fourth receiving module 171 receives the downlink data and the address information of the MME, send the downlink data to the MME according to the address information of the MME and by using a fourth signaling message of the second type between the P-CSCF and the MME.

In an optional implementation manner of this embodiment, that the fourth receiving module 171 is configured to receive, by using a second signaling message between the P-CSCF and an MME, uplink data that is sent by a terminal device to an application server includes the fourth receiving module 171 is specifically configured to receive the first signaling message of the second type sent by an MSC server, where the first signaling message of the second type is generated by the MSC server according to a first signaling message that is of a third type and sent by the MME, and the first signaling message of the third type includes the uplink data.

In an optional implementation manner of this embodiment, that the fourth sending module 172 is configured to send the downlink data to the MME according to the address information of the MME and by using a fourth signaling message of the second type between the P-CSCF and the MME includes the fourth sending module 172 is specifically configured to send the fourth signaling message of the second type to an MSC server, so that the MSC server encapsulates the downlink data in the fourth signaling message of the second type into a second signaling message of a third type and sends the second signaling message of the third type to the MME.

Functional modules of the P-CSCF provided in this embodiment may be configured to implement a procedure of the foregoing data transmission method described from the perspective of the P-CSCF. A specific operating principle thereof is not described again, and reference may be made to the description of the method embodiment for details.

The P-CSCF in this embodiment, in collaboration with the terminal device, the base station, and the MME provided in the foregoing embodiments, performs small data transmission based on a signaling message of a first type between the MME and the terminal device, and a signaling message of a second type between the MME and the P-CSCF. There is no need to specially establish or restore a user plane RAB between the terminal device and a network air interface side, which saves a network resource, improves small data transmission efficiency, reduces signaling interaction between the terminal device and a network side, and reduces network load.

Figure 18:
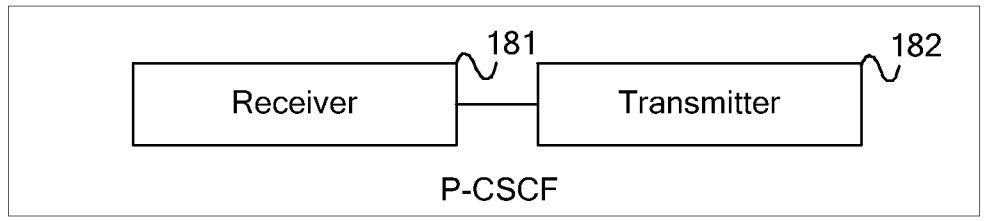
FIG. 18 is a schematic structural diagram of a P-CSCF according to another embodiment of the present invention.

FIG. 18 is a schematic structural diagram of a P-CSCF according to another embodiment of the present invention. As shown in FIG. 18, the P-CSCF in this embodiment includes a receiver 181 and a transmitter 182.

The receiver 181 is configured to receive, by using a first signaling message of a second type between the P-CSCF and an MME, uplink data that is sent by a terminal device to an application server, where the first signaling message of the second type is generated by the MME according to the uplink data in a first signaling message of a first type after the MME receives the first signaling message of the first type sent by a base station, the first signaling message of the second type includes the uplink data, and a data volume of the uplink data is less than a preset data volume threshold.

The transmitter 182, which is connected to the receiver 181, is configured to send, to an S-CSCF, the uplink data received by the receiver 181, so that the S-CSCF sends the uplink data to the application server.

The P-CSCF provided in this embodiment may be configured to implement a procedure of the foregoing data transmission method described from the perspective of the P-CSCF. A specific operating principle thereof is not described again, and reference may be made to the description of the method embodiment for details.

The P-CSCF in this embodiment, in collaboration with the terminal device, the base station, and the MME provided in the foregoing embodiments, performs small data transmission based on a signaling message of a first type between the MME and the terminal device, and a signaling message of a second type between the MME and the P-CSCF. There is no need to specially establish or restore a user plane RAB between the terminal device and a network air interface side, which saves a network resource, improves small data transmission efficiency, reduces signaling interaction between the terminal device and a network side, and reduces network load.

An embodiment of the present invention provides a data transmission system, including: the terminal device, the base station, the MME, and the P-CSCF provided in the foregoing embodiments of the present invention, where the P-CSCF is connected to the MME. Structures and operating principles of the terminal device, the base station, the MME, and the P-CSCF are not described again, and reference may be made to descriptions of the foregoing embodiments.

The data transmission system provided in this embodiment may be used to implement a procedure of each of the foregoing data transmission method embodiments, or may be used to perform small data transmission based on a signaling message of a first type between an MME and a terminal device, and a signaling message of a second type between the MME and a P-CSCF. There is no need to specially establish or restore a user plane RAB between the terminal device and a network air interface side, which saves a network resource, improves small data transmission efficiency, reduces signaling interaction between the terminal device and a network side, and reduces network load.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A terminal device, comprising:
   a processor, configured to determine whether a data volume of uplink data to be sent is less than a preset data volume threshold;
   a transmitter, configured to send a Radio Resource Control (RRC) connection request message to a base station when the processor determines that the data volume of the uplink data is less than the preset data volume threshold, wherein the RRC connection request message comprises indication information that instructs the base station to establish only a signaling connection for the terminal device; and
   a receiver, configured to, after the transmitter sends the RRC connection request message, receive an RRC connection establishment message sent by the base station;
   wherein the transmitter is further configured to, after the receiver receives the RRC connection establishment message, carry the uplink data in an RRC connection completion message and send the RRC connection completion message to the base station, so that the base station can send the uplink data to a mobility management entity (MME) according to the indication information and by using a first signaling message of a first type between the base station and the MME, so that the MME sends the uplink data to an application server corresponding to the uplink data by using a first signaling message of a second type between the MME and a proxy-call session control function (P-CSCF);
   wherein the transmitter is further configured to send an attach request message to the MME before the processor determines whether the data volume of the uplink data to be sent is less than the preset data volume threshold, wherein the attach request message comprises an identifier of the terminal device;
   wherein the receiver is further configured to, after the transmitter sends the attach request message to the MME, receive the attach accept message sent by the MME, wherein the attach accept message comprises an IP address that is allocated by the MME for the terminal device;
   wherein the transmitter is configured to, after the receiver receives an attach accept message sent by the MME, send, according to an IP address that is in the attach accept message and allocated by the MME for the terminal device, a first SIP registration request message to the MME by using a second signaling message of the first type between the terminal device and the MME, so that the MME can send the first SIP registration request message to the application server by using a second signaling message of the second type between the MME and the P-CSCF, wherein the first SIP registration request message comprises the identifier of the terminal device and a SIP identifier corresponding to the terminal device;
   wherein the receiver is further configured to, after the transmitter sends the first SIP registration request message to the MME, receive, by using a third signaling message of the first type between the terminal device and the MME, a first SIP registration completion message returned by the MME, wherein the first SIP registration completion message is returned by the application server after the application server receives the SIP identifier corresponding to the terminal device, and the MME receives the first SIP registration completion message by using a third signaling message of the second type between the MME and the P-CSCF; and
   wherein only a signaling connection exists between the terminal device and the MME.

2. The terminal device according to claim 1, wherein the receiver is further configured to receive a paging message sent by the MME, and to receive a fourth signaling message that is of the first type and sent by the MME according to a service request message sent by the transmitter;
   wherein the paging message is generated by the MME after the MME receives, by using a fourth signaling message of the second type between the MME and the P-CSCF, downlink data that is sent by the application server to the terminal device, and the fourth signaling message of the first type comprises the downlink data; and
   wherein the transmitter is further configured to send the service request message to the MME after the receiver receives the paging message, the service request message being used to instruct the MME to establish a signaling connection only for the terminal device.

3. A base station, comprising:
   a receiver; and
   a transmitter;
   wherein the receiver is configured to receive a Radio Resource Control (RRC) connection request message sent by a terminal device, and to receive, after the transmitter sends an RRC connection establishment message to the terminal device, an RRC connection completion message sent by the terminal device, wherein the RRC connection request message is generated by the terminal device when the terminal device determines that a data volume of uplink data to be sent is less than a preset data volume threshold, wherein the RRC connection request message comprises indication information that instructs the base station to establish a signaling connection only for the terminal device, and wherein the RRC connection completion message comprises the uplink data; and wherein the transmitter is configured to send the RRC connection establishment message to the terminal device after the receiver receives the RRC connection request message, and after the receiver receives the RRC connection completion message, to send the uplink data to a mobility management entity (MME) according to the indication information and by using a first signaling message of a first type between the base station and the MME, so that the MME can send the uplink data to an application server corresponding to the uplink data by using a first signaling message of a second type between the MME and a proxy-call session control function (P-CSCF);

wherein the receiver is further configured to receive an attach request message from the terminal and send the attach request message to the MME using the transmitter, wherein the attach request message comprises an identifier of the terminal device;

wherein the receiver is further configured to receive an attach accept message sent by the MME, wherein the attach accept message comprises an IP address that is allocated by the MME for the terminal device;

wherein the receiver is further configured to receive a first SIP registration request message from the terminal device and send the first SIP registration request to the MME by using a second signaling message of the first type between the terminal device and the MME, so that the MME can send the first SIP registration request message to the application server by using a second signaling message of the second type between the MME and the P-CSCF, wherein the first SIP registration request message comprises the identifier of the terminal device and a SIP identifier corresponding to the terminal device;

wherein the receiver is further configured to, after the transmitter sends the first SIP registration request message to the MME, receive, by using a third signaling message of the first type between the terminal device and the MME, a first SIP registration completion message returned by the MME, wherein the first SIP registration completion message is returned by the application server after the application server receives the SIP identifier corresponding to the terminal device, and the MME receives the first SIP registration completion message by using a third signaling message of the second type between the MME and the P-CSCF; and wherein only a signaling connection exists between the terminal device and the MME.

4. A mobility management entity (MME), comprising:

a receiver, configured to receive a first signaling message of a first type sent by a base station, wherein the first signaling message of the first type is generated, according to indication information in a Radio Resource Control (RRC) connection request message originating from a terminal device and after the base station receives an RRC connection completion message sent by the terminal device, wherein the RRC connection completion message comprises uplink data that is sent by the terminal device to an application server, the first signaling message of the first type comprises the uplink data, and the indication information is used to instruct the base station to establish a signaling connection only for the terminal device; and a transmitter, configured to send the uplink data to the application server by using a first signaling message of a second type between the MME and a proxy-call session control function (P-CSCF);

wherein the receiver is further configured to, before receiving the first signaling message of the first type, receive an attach request message sent by the terminal device, wherein the attach request message comprises an identifier of the terminal device;

wherein the transmitter is further configured to, after receiving the attach request message, send an attach accept message to the terminal device using the transmitter, wherein the attach accept message comprises an IP address that is allocated by the MME for the terminal device;

wherein the transmitter is further configured to send a first Session Initiation Protocol (SIP) registration request message to the application server by using a second signaling message of the second type between the MME and the P-CSCF, wherein the first SIP registration request message comprises the identifier of the terminal device and a SIP identifier corresponding to the terminal device;

wherein the receiver is further configured to receive, by using a third signaling message of the second type between the MME and the P-CSCF, a first SIP registration completion message returned by the application server after a SIP identifier corresponding to the terminal device is received;

wherein the transmitter is further configured to send the first SIP registration completion message to the terminal device; and wherein only a signaling connection exists between the terminal device and the MME.

5. The MME according to claim 4, further comprising:

a processor, configured to acquire, according to the identifier of the terminal device, the SIP identifier corresponding to the terminal device, and to generate the first SIP registration request message, wherein the first SIP registration request message comprises the identifier of the terminal device and the SIP identifier corresponding to the terminal device.

6. The MME according to claim 4, wherein to a processor is configured to instruct the transmitter to send a location update request message to a home subscriber server (HSS), wherein the location update request message comprises the identifier of the terminal device; and wherein the receiver is further configured to receive a mapping relationship between the identifier of the terminal device and the SIP identifier corresponding to the terminal device, wherein the mapping relationship is returned by the HSS according to the identifier of the terminal device.

7. The MME according to claim 4, wherein the processor is specifically configured to generate, according to the identifier of the terminal device, the SIP identifier corresponding to the terminal device.

8. The MME according to claim 4, wherein the transmitter is further configured to, before the receiver receives the first signaling message of the first type, send a second SIP registration request message to the P-CSCF by using a second signaling message of the second type between the MME and the P-CSCF, so that the P-CSCF sends the second SIP registration request message to the application server;

wherein the second signaling message of the second type comprises the second SIP registration request message, and the second SIP registration request message comprises an identifier of the MME and a SIP identifier corresponding to the MME; and wherein the receiver is further configured to, after the transmitter sends the second SIP registration request message, receive, by using a third signaling message of the second type between the MME and the P-CSCF, a second SIP registration completion message that is returned by the application server after the application server receives the SIP identifier corresponding to the MME.

9. The MME according to claim 4, wherein the receiver is further configured to receive, by using a fourth signaling message of the second type between the MME and the P-CSCF, downlink data that is sent by the application server to the terminal device, and after the transmitter sends a paging message to the terminal device, receive a service request message sent by the terminal device; and wherein the transmitter is further configured to send the paging message to the terminal device after the receiver receives the downlink data, and, after the receiver receives the service request message, send a fourth signaling message of the first type to the terminal device, wherein the fourth signaling message of the first type comprises the downlink data.

10. The MME according to claim 9, wherein that the receiver is configured to receive a second signaling message of a third type sent by an MSC server, wherein the second signaling message of the third type is generated by the MSC server according to the fourth signaling message that is of the second type and sent by the P-CSCF, and the second signaling message of the third type comprises the downlink.

11. The MME according to claim 4, wherein that the transmitter is configured to send a first signaling message of a third type to an mobile switching center (MSC) server, wherein the first signaling message of the third type comprises the uplink data, so that the MSC server can encapsulate the uplink data into the first signaling message of the second type and send the first signaling message of the second type to the P-CSCF, so as to send the uplink data to the application server.

* * * * *

UNITED STATES PATENT AND TRADEMARK OFFICE
CERTIFICATE OF CORRECTION

PATENT NO. : 9,549,424 B2
APPLICATION NO. : 14/671724
DATED : January 17, 2017
INVENTOR(S) : Frank Mademann It is certified that error appears in the above-identified patent and that said Letters Patent is hereby corrected as shown below:

In Column 48, Line 39, Claim 6, delete "wherein to a" and insert --wherein a--.

In Column 50, Line 9, Claim 10, delete "the downlink" and insert --the downlink data--.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*